United States Patent
Kimura et al.

(10) Patent No.: US 9,579,566 B2
(45) Date of Patent: *Feb. 28, 2017

(54) VIDEO GAME WITH HELPER ROLE OR OBSTRUCTER ROLE FOR SECOND PLAYER HAVING SEPARATE DISPLAY

(71) Applicant: Nintendo Co., Ltd., Kyoto (JP)

(72) Inventors: Hiroyuki Kimura, Kyoto (JP); Masataka Takemoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 121 days.

This patent is subject to a terminal disclaimer.

(21) Appl. No.: 13/959,330

(22) Filed: Aug. 5, 2013

(65) Prior Publication Data

US 2013/0324249 A1 Dec. 5, 2013

Related U.S. Application Data

(63) Continuation of application No. 13/358,795, filed on Jan. 26, 2012, now Pat. No. 8,628,391.

(30) Foreign Application Priority Data

May 24, 2011 (JP) .................................. 2011-115581

(51) Int. Cl.
*A63F 13/00* (2014.01)
*A63F 13/2145* (2014.01)
(Continued)

(52) U.S. Cl.
CPC .......... *A63F 13/2145* (2014.09); *A63F 13/06* (2013.01); *A63F 13/10* (2013.01);
(Continued)

(58) Field of Classification Search
CPC ...... A63F 13/10; A63F 13/12; A63F 13/2145; A63F 13/26; A63F 13/323; A63F 13/40;
(Continued)

(56) References Cited

U.S. PATENT DOCUMENTS 6,238,291 B1 * 5/2001 Fujimoto et al. ............... 463/44
6,375,572 B1 4/2002 Masuyama et al.
(Continued)

FOREIGN PATENT DOCUMENTS

EP    2 015 854 B1    11/2013
JP    6-285259 A     10/1994
(Continued)

OTHER PUBLICATIONS

Super Mario Galaxy Operation Manual, Nintendo Co., Ltd., Nov. 1, 2007, pp. 8-9, with partial English translation, 3 pages.
(Continued)

*Primary Examiner* — Lawrence Galka
(74) *Attorney, Agent, or Firm* — Nixon & Vanderhye P.C.

(57) ABSTRACT

A main player operates a controller while viewing a monitor game image displayed on a monitor. A sub player operates a terminal device while viewing a terminal game image displayed on an LCD of the terminal device. A game image that is substantially identical to the monitor game image viewed by the main player is displayed on the LCD. By touching a touch panel provided on a screen of the LCD of the terminal device, the sub player can generate various events at a position in a game world corresponding to a touched position.

21 Claims, 17 Drawing Sheets

(51) Int. Cl.
- A63F 13/55 (2014.01)
- A63F 13/843 (2014.01)
- A63F 13/26 (2014.01)
- A63F 13/323 (2014.01)
- A63F 13/40 (2014.01)
- A63F 13/86 (2014.01)
- A63F 13/60 (2014.01)
- A63F 13/50 (2014.01)
- A63F 13/20 (2014.01)

(52) U.S. Cl.
CPC ............ *A63F 13/26* (2014.09); *A63F 13/323* (2014.09); *A63F 13/40* (2014.09); *A63F 13/50* (2014.09); *A63F 13/55* (2014.09); *A63F 13/60* (2014.09); *A63F 13/843* (2014.09); *A63F 13/86* (2014.09); *A63F 2300/105* (2013.01); *A63F 2300/1075* (2013.01); *A63F 2300/301* (2013.01); *A63F 2300/305* (2013.01); *A63F 2300/6018* (2013.01); *A63F 2300/8088* (2013.01)

(58) Field of Classification Search
CPC ...... A63F 13/42; A63F 13/426; A63F 13/428; A63F 13/45; A63F 13/50; A63F 13/52; A63F 13/55; A63F 13/60; A63F 13/843; A63F 13/86

See application file for complete search history.

(56) References Cited

U.S. PATENT DOCUMENTS

| | | | | |
|---|---|---|---|---|
| 6,921,336 | B1 | 7/2005 | Best | |
| 7,357,719 | B2* | 4/2008 | Yamato et al. | 463/43 |
| 2003/0216177 | A1 | 11/2003 | Aonuma et al. | |
| 2010/0113148 | A1 | 5/2010 | Haltovsky et al. | |

FOREIGN PATENT DOCUMENTS

| | | |
|---|---|---|
| JP | 8-173633 A | 7/1996 |
| JP | 2001-34247 A | 2/2001 |
| WO | 2007/128949 A1 | 11/2007 |
| WO | 2011/059176 A2 | 5/2011 |

OTHER PUBLICATIONS

"Battlefield 2 Commander", dated Dec. 13, 2005, online, retrieved Mar. 18, 2013 from the Internet, <URL:http://webpages.charter.net/heatherdowns/BF2%20Commander.pdf>, 14 pages.

"Battlefield 2 Manual", dated 2005, online, retrieved Mar. 19, 2013 from the Internet, <URL:http://www.replacementdocs.com/download.php?view.2754>, 8 pages.

"Gamefaqs Battlefield 2", dated 2011, online, retrieved Mar. 19, 2013 from the Internet, <URL:http://www.gamefaqs.com/pc/920407-battlefield-2/faqs/39586>, 23 pages.

"Wikipedia Battlefield 2", from Wikipedia, The Free Encyclopedia, online, retrieved Mar. 18, 2013 from the Internet, <URL: http://en.wikipedia.org/wiki/Battlefield_2>, 10 pages.

"Wikipedia Gai Kai", from Wikipedia, The Free Encyclopedia, online, retrieved Mar. 20, 2013 from the Internet, <URL:http://en.wikipedia.org/wiki/Gaikai>, 4 pages.

Extended European Search Report dated May 23, 2014, issued in corresponding European Patent Application No. 12152280.9.

Communication Pursuant to Article 94(3) EPC dated Dec. 14, 2015, issued in corresponding European Patent Application No. 12 152 280.9.

Office Action dated Feb. 4, 2016, issued in related U.S. Appl. No. 13/959,367.

Notice of Allowance and Fee(s) Due dated Nov. 12, 2015, issued in related U.S. Appl. No. 13/959,367.

"Wikipedia Pokemon Battle Revolution". From Wikipedia, The Free Encylopedia. [online], [retrieved on Aug. 17, 2012]. Retrieved from the Internet <URL:http://en.wikipedia.org/wiki/Pokemon_Battle_Revolution>. 3 pages.

"Pokemon Battle Revolution Manual", [dated 2007]. [retrieved Aug. 17, 2012]. Retrieved from the Internet <URL:http://www.replacementdocs.com/download.php?view.71101>. 12 pages.

"Pokemon Battle Revolution DS Screens", [dated 2007]. [retrieved Aug. 17, 2012]. Retrieved from the Internet <URL:http://www.replacementdocs.com/download.php?view.71101>. 1 page.

* cited by examiner

VIDEO GAME WITH HELPER ROLE OR OBSTRUCTER ROLE FOR SECOND PLAYER HAVING SEPARATE DISPLAY

CROSS-REFERENCE TO RELATED APPLICATIONS

This application is a continuation of U.S. patent application Ser. No. 13/358,795 filed Jan. 26, 2012, and claims priority of Japanese Patent Application No. 2011-115581 filed May 24, 2011. The disclosures of the prior applications are incorporated herein in their entirety by reference.

FIELD

The exemplary embodiments disclosed herein relates to a computer-readable storage medium, a game apparatus, a game system, and a game processing method; and, in particular, relates to a computer-readable storage medium, a game apparatus, a game system, and a game processing method enabling a plurality of players to play the same game together.

BACKGROUND AND SUMMARY

Conventionally, there are games in which, while a certain player (main player) is playing the game through controlling of a player character, another player (sub player) can assist the main player.

In the conventional games, the main player and the sub player each had to conduct operations (for the main player, controlling a player character; and for the sub player, operation to assist the main player) while watching the same screen.

A feature of certain exemplary embodiments is to provide a new computer-readable storage medium, game apparatus, game system, and game processing method enabling a plurality of players to play the same game together.

The above described feature is achieved, for example, by the configurations described in the following.

A first configurational example is a computer-readable storage medium having stored thereon a game program executed by a computer of a game apparatus for conducting a game process in accordance with an input from a portable display device including a touch panel and an input from at least one input device. The game program causes the computer to function as a first input reception section, a second input reception section, a game processing section, an image generation section, a first display control section, and a second display control section.

The first input reception section is configured to receive an input from the touch panel. The second input reception section is configured to receive an input from the at least one input device. The game processing section is configured to conduct a predetermined game process based on an input received by the first input reception section from the touch panel and an input received by the second input reception section from the at least one input device. The image generation section is configured to generate a first game image and a second game image of an identical game world in accordance with a game process result obtained by the game processing section. The first display control section is configured to output the first game image generated by the image generation section to the portable display device. The second display control section is configured to output the second game image generated by the image generation section to a display device that is different from the portable display device. Furthermore, the game processing section generates a predetermined event at a position in the game world corresponding to a position on the second game image instructed through the touch panel.

The predetermined event may include an event that assists progress of the game conducted based on an input from the at least one input device.

Furthermore, the predetermined event may include an event that obstructs progress of the game conducted based on an input from the at least one input device.

Furthermore, the game processing section may move a predetermined object within the game world based on an input from the at least one input device.

Furthermore, the game world may be absent of any objects that are moved based on an input from the portable display device.

Furthermore, the game progressed by the game process may be a game whose objective is achievable without an input from the portable display device.

Furthermore, an input from the at least one input device may have direct influence on an outcome of the game progressed by the game process, and an input from the portable display device may lack any direct influence on the outcome of the game progressed by the game process.

Furthermore, the first game image and the second game image may be substantially identical game images.

Furthermore, display modes of a specific object in the game world may be different in the first game image and the second game image.

Furthermore, a display mode of the specific object in the first game image may be a display mode that is more advantageous for a player than a display mode of the specific object in the second game image.

Furthermore, the first game image and the second game image may be game images showing an identical range of the identical game world.

Furthermore, the first game image and the second game image may be game images of the game world from an identical direction.

Furthermore, the image generation section may generate the second game image so as to scroll in accordance with scrolling of the first game image.

Furthermore, the first display control section may output the first game image to the portable display device through wireless transmission.

Furthermore, the first display control section may compress and output the first game image to the portable display device.

Furthermore, an input section that is different from the touch panel may be provided on the portable display device. Furthermore, in addition to an input from the touch panel, the first input reception section may receive an input also from the input section.

Furthermore, the game program may cause the computer to further function as a displacement amount determination section configured to determine an amount of displacement based on a signal from the portable display device. Furthermore, the image generation section may change, in accordance with the amount of displacement determined by the displacement amount determination section, a relative position of a range of the game world displayed in the first game image with respect to a range of the game world displayed in the second game image.

Furthermore, the displacement amount determination section may detect a movement of the portable display device based on a signal from the portable display device, and may determine the amount of displacement in accordance with the movement of the portable display device.

A second configurational example is a game apparatus for conducting a game process in accordance with an input from a portable display device including a touch panel and an input from at least one input device. The game apparatus includes a first input reception section, a second input reception section, a game processing section, an image generation section, a first display control section, and a second display control section.

A third configurational example is a game system for conducting a game process in accordance with an input from a portable display device including a touch panel and an input from at least one input device. The game system includes a first input reception section, a second input reception section, a game processing section, an image generation section, a first display control section, and a second display control section.

A fourth configurational example is a game processing method for conducting a game process in accordance with an input from a portable display device including a touch panel and an input from at least one input device.

The method includes: receiving an input from the touch panel; receiving an input from the at least one input device; conducting a predetermined game process based on the input received from the touch panel and the input received from the at least one input device; generating a first game image and a second game image of an identical game world in accordance with a game process result; outputting, to the portable display device, the generated first game image; and outputting, to a display device that is different from the portable display device, the generated second game image, wherein in the game process, a predetermined event is generated at a position in the game world corresponding to a position on the second game image instructed through the touch panel.

With the exemplary embodiments disclosed herein, a new computer-readable storage medium, game apparatus, game system, and game processing method enabling a plurality of players to play the same game together can be provided.

These and other objects, features, aspects and advantages of the exemplary embodiments disclosed herein will become more apparent from the following detailed description of the certain exemplary embodiments when taken in conjunction with the accompanying drawings.

DETAILED DESCRIPTION OF NON-LIMITING EXAMPLE EMBODIMENTS

A game system according to one embodiment will be described with reference to FIG. 1.

Figure 1:
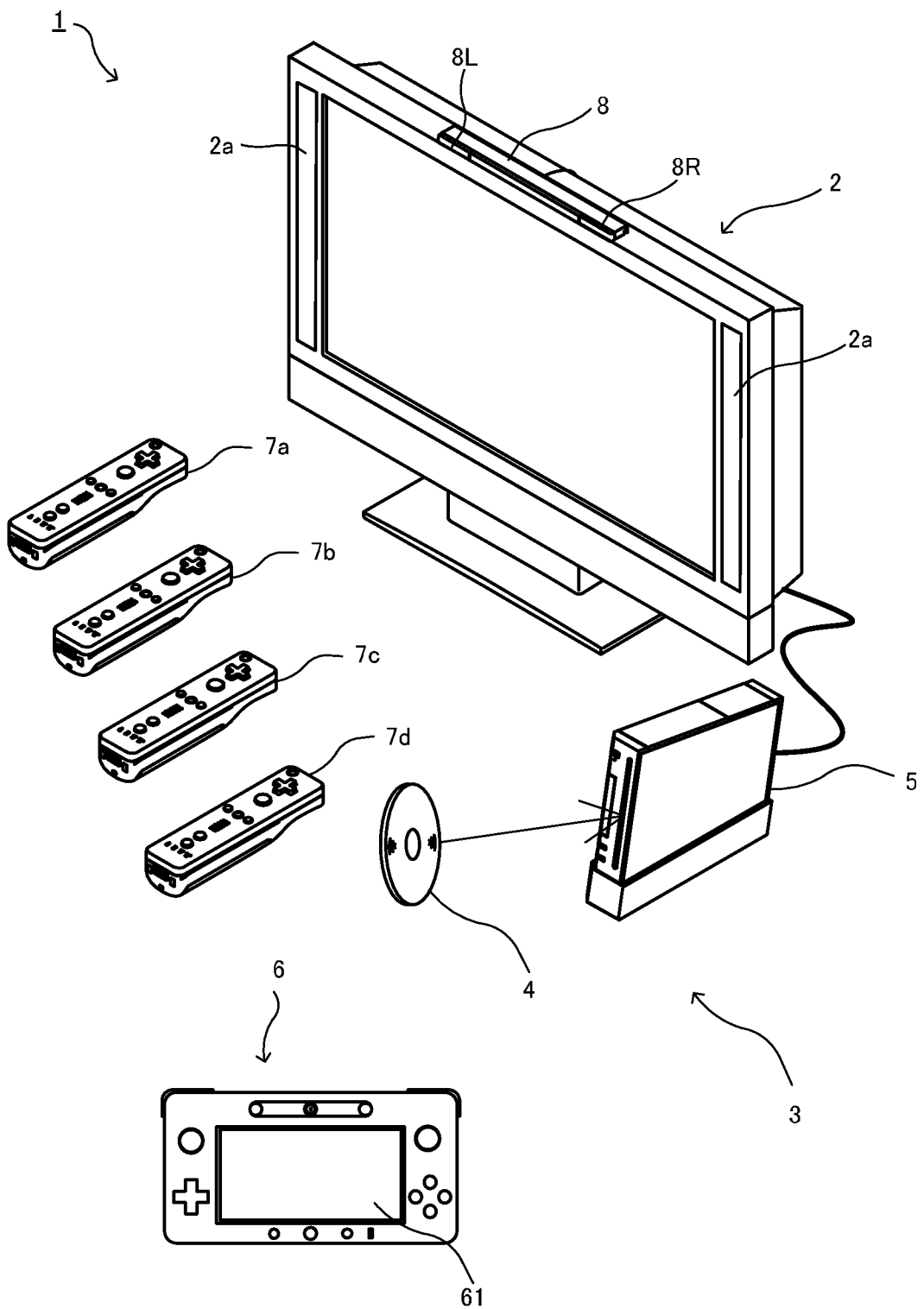
FIG. 1 is a perspective view showing a non-limiting example of a game system 1 according to one embodiment.

As shown in FIG. 1, a game system 1 includes a household television receiver (hereinafter, referred to as a monitor) 2 which is an example of display means, and a stationary game apparatus 3 connected to the monitor 2 via a connection cord. The monitor 2 includes loudspeakers 2a. Furthermore, the game apparatus 3 includes an optical disc 4, a game apparatus body 5, a terminal device 6, and controllers 7a, 7b, 7c, and 7d (hereinafter, described simply as a controller 7 when there is no particular need to distinguish these as the controllers 7a, 7b, 7c, and 7d).

The optical disc 4 has stored therein an information processing program (typically, a game program) to be executed by the game apparatus body 5.

The monitor 2 displays a game image outputted from the game apparatus body 5. The monitor 2 includes the loudspeakers 2a, and each of the loudspeakers 2a outputs a game sound outputted from the game apparatus body 5.

The game apparatus body 5 executes a game process or the like based on a game program stored in the optical disc 4.

A plurality of operation sections (operation buttons) are provided on the controller 7. The controller 7 transmits, to the game apparatus body 5, operation data (controller operation data) representing input states (whether or not each of the operation buttons has been held down) of the operation sections by using, for example, Bluetooth (registered trademark) technology.

Furthermore, the controller 7 includes an imaging section for taking images of a marker 8 having two LED modules (hereinafter, referred to as "markers") 8L and 8R disposed in the vicinity (in the upper side of the screen in FIG. 1) of the display screen of the monitor 2, and an imaging information calculation section for calculating positions of the markers within an image taken by the imaging section. The positions of the markers calculated by the imaging information calculation section are transmitted to the game apparatus body 5 as marker coordinate data. In the game apparatus body 5, the movement, position, attitude, and the like can be calculated by the controller 7 based on the marker coordinate data.

Furthermore, the controller 7 is provided with an acceleration sensor and a gyro sensor. Acceleration data representing acceleration detected by the acceleration sensor and angular velocity data representing angular velocity detected by the gyro sensor are transmitted to the game apparatus body 5. In the game apparatus body 5, directions, movements, and behaviors of the controller 7 can be calculated based on the acceleration data and/or the angular velocity data.

The terminal device 6 is a portable device that is small enough to be held by a user, and the user is allowed to move the terminal device 6 with hands, or place the terminal device 6 at any location. Although the specific structure of the terminal device 6 will be described later, the terminal device 6 includes an LCD (Liquid Crystal Display) 61 as display means, and input means (a touch panel 62, a gyro sensor 604, and the like described later). The terminal device 6 and the game apparatus body 5 are communicable with each other wirelessly or via a cable. The terminal device 6 receives, from the game apparatus body 5, data of an image (e.g., a game image) generated in the game apparatus body 5, and displays the image represented by the data on an LCD 61. Although in the exemplary embodiment, an LCD is used as a display device, the terminal device 6 may include any other display device, such as a display device utilizing EL (Electro Luminescence), for example. Further, the terminal device 6 transmits, to the game apparatus body 5, operation data representing the content of an operation performed on the terminal device 6.

Figure 2:
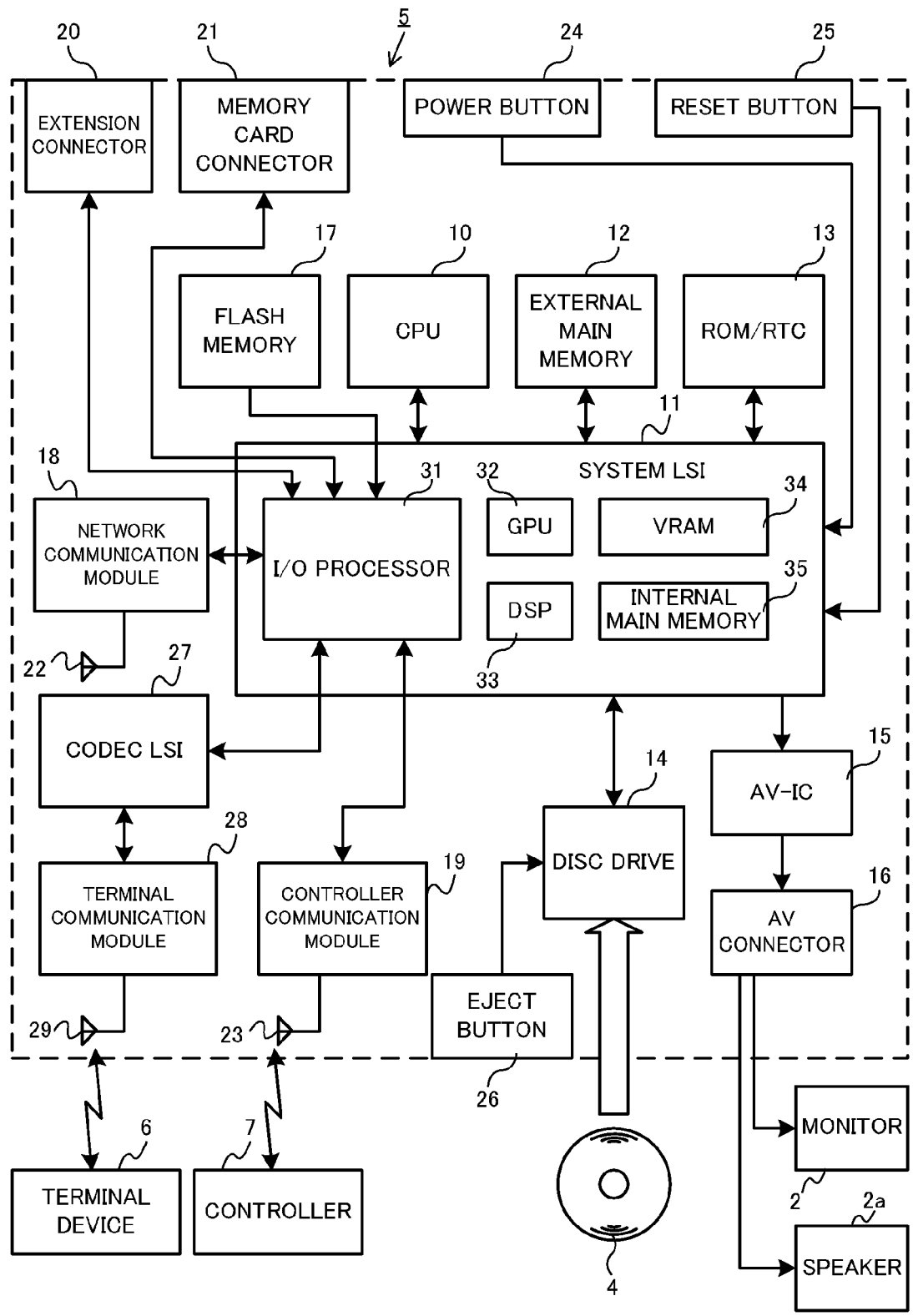
FIG. 2 is a functional block diagram showing a non-limiting example of a game apparatus body 5 in FIG. 1.

Next, with reference to FIG. 2, an internal structure of the game apparatus body 5 will be described. FIG. 2 is a block diagram illustrating an example of an internal structure of the game apparatus body 5. The game apparatus body 5 includes a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15 and the like.

In addition to the CPU 10, the external main memory 12, the ROM/RTC 13, the disc drive 14, and the AV-IC 15 are connected to the system LSI 11. The external main memory 12, which is a volatile memory, is used as a work region and a buffer region for the CPU 10. The ROM/RTC 13 includes a ROM (so-called boot ROM) incorporating a program for booting the game apparatus body 5, and a clock circuit (RTC) for counting time. The disc drive 14 reads, from the optical disc 4, program data, texture data and the like, and writes the read data into an internal main memory 35 described below or the external main memory 12.

The system LSI 11 includes an input/output processor (I/O processor) 31, a GPU (Graphics Processor Unit) 32, a DSP (Digital Signal Processor) 33, a VRAM (Video RAM) 34, and the internal main memory 35.

The GPU 32 generates an image in accordance with a graphics command (draw command) supplied from the CPU 10. In the exemplary embodiment, the game apparatus body 5 may generate both a game image to be displayed on the monitor 2 and a game image to be displayed on the terminal device 6. Hereinafter, the game image to be displayed on the monitor 2 may be referred to as a "monitor game image," and the game image to be displayed on the terminal device 6 may be referred to as a "terminal game image."

The DSP 33, serving as an audio processor, generates sound data by using sound data and sound waveform (tone quality) data stored in the internal main memory 35 and the external main memory 12. In the exemplary embodiment, similarly to the game images, both a game sound to be outputted from the loudspeakers 2a of the monitor 2 and a game sound to be outputted from the loudspeakers of the terminal device 6 may be generated. Hereinafter, the game sound to be outputted from the monitor 2 may be referred to as a "monitor game sound," and the game sound to be outputted from the terminal device 6 may be referred to as a "terminal game sound."

Among the image data and sound data generated by the game apparatus body 5, the image data and sound data to be outputted to the monitor 2 are read by the AV-IC 15. Through an AV connector 16, the AV-IC 15 outputs the read image data to the monitor 2 and outputs the read sound data to the loudspeakers 2a included in the monitor 2. Thereby, an image is displayed on the monitor 2, and sounds are outputted from the loudspeakers 2a.

Further, among the image data and sound data generated by the game apparatus body 5, the image data and sound data to be outputted to the terminal device 6 are transmitted to the terminal device 6 by the I/O processor 31 or the like. Data transmission to the terminal device 6 by the I/O processor 31 or the like will be described later.

The I/O processor 31 executes data reception and transmission with the components connected thereto, and download of data from an external apparatus. The I/O processor 31 is connected to a flash memory 17, a network communication module 18, a controller communication module 19, an extension connector 20, a memory card connector 21, and a codec LSI 27. The codec LSI 27 is connected to a terminal communication module 28.

The game apparatus body 5 is connected to a network such as the Internet so as to communicate with external information processing apparatuses (for example, other game apparatuses or various servers). That is, the I/O processor 31 is connected to a network via the network communication module 18 and the antenna 22 so as to communicate with external information processing apparatuses connected to the network. The flash memory 17 may store not only the data transmitted and received between the game apparatus body 5 and the external information processing apparatuses, but also saved data (result data or progress data of the process) of the game played with the game apparatus body 5. Further, the flash memory 17 may store programs such as a game program.

The game apparatus body 5 can receive operation data from the controller 7. That is, the I/O processor 31 receives, via the antenna 23 and the controller communication module 19, operation data or the like transmitted from the controller 7, and stores (temporarily) the data in a buffer region of the internal main memory 35 or the external main memory 12.

The game apparatus body 5 is capable of transmitting/receiving image data, sound data and the like to/from the terminal device 6. The I/O processor 31 outputs data of a game image (terminal game image) generated by the GPU 32 to the codec LSI 27. The codec LSI 27 performs a predetermined compression process on the image data supplied from the I/O processor 31. The terminal communication module 28 performs wireless communication with the terminal device 6. Accordingly, the image data compressed by the codec LSI 27 is transmitted by the terminal communication module 28 to the terminal device 6 via an antenna 29. In the exemplary embodiment, the codec LSI 27 compresses the image data by using a highly efficient compression technique, for example, the H.264 standard. The codec LSI 27 may adopt other compression techniques. When the communication rate is sufficiently high, uncompressed image data may be transmitted. The terminal communication module 28 is, for example, a Wi-Fi certified communication module. The terminal communication module 28 may perform wireless communication with the terminal device 6 at a high speed by using, for example, the technique of MIMO (Multiple Input Multiple Output) adopted in the IEEE802.11n standard, or may use other communication techniques.

The game apparatus body 5 transmits, to the terminal device 6, sound data as well as the image data. That is, the I/O processor 31 outputs sound data (terminal game sound) generated by the DSP 33 to the terminal communication module 28 via the codec LSI 27. The codec LSI 27 performs a compression process on the sound data in a manner similar to that for the image data. Any compression technique may be adopted for the sound data. In another embodiment, uncompressed sound data may be transmitted. The terminal communication module 28 transmits the compressed image data and sound data to the terminal device 6 via the antenna 29.

The game apparatus body 5 transmits, in addition to the image data and sound data, various control data to the terminal device 6, according to need. The control data represent control instructions for the components included in the terminal device 6, such as an instruction to control on/off of a marker section (a marker section 65 shown in FIG. 5), and an instruction to control image taking of a camera (a camera 66 shown in FIG. 5). The I/O processor 31 transmits the control data to the terminal device 6 in response to an instruction from the CPU 10.

The game apparatus body 5 can receive various data from the terminal device 6. Although details will be described later, in the exemplary embodiment, the terminal device 6 transmits operation data, image data, and sound data. The respective data transmitted from the terminal device 6 are received by the terminal communication module 28 via the antenna 29. The image data and sound data transmitted from the terminal device 6 have been subjected to a compression process similar to that for the image data and sound data transmitted from the game apparatus body 5 to the terminal device 6. Accordingly, these image data and sound data are transmitted from the terminal communication module 28 to the codec LSI 27, and subjected to a decompression process by the codec LSI 27. The decompressed data are outputted to the I/O processor 31. The operation data, which has been received by the terminal communication module 28, is outputted to the I/O processor 31 via the codec LSI 27. The I/O processor 31 stores (temporarily) the data received from the terminal device 6 in the buffer region of the internal main memory 35 or the external main memory 12.

The game apparatus body 5 is connectable to other devices and external storage media via the extension connector 20 and the memory card connector 21.

The game apparatus body 5 includes (on the front main surface thereof, for example) a power button 24, a reset button 25, an insertion slot through which the optical disc 4 is inserted, an eject button 26 for ejecting the optical disc 4 from the insertion slot of the game apparatus body 5, and the like.

In another embodiment, some of the components of the game apparatus body 5 may be constituted as an extension device separated from the game apparatus body 5. At this time, the extension device may be connected to the game apparatus body 5 via the extension connector 20, for example. Specifically, the extension device may include, for example, the codec LSI 27, the terminal communication module 28, and the antenna 29, and may be detachably connected to the extension connector 20. Thus, by connecting the extension device to the game apparatus body which does not have the above-mentioned, the game apparatus body can be made communicable with the terminal device 6.

Figure 3:
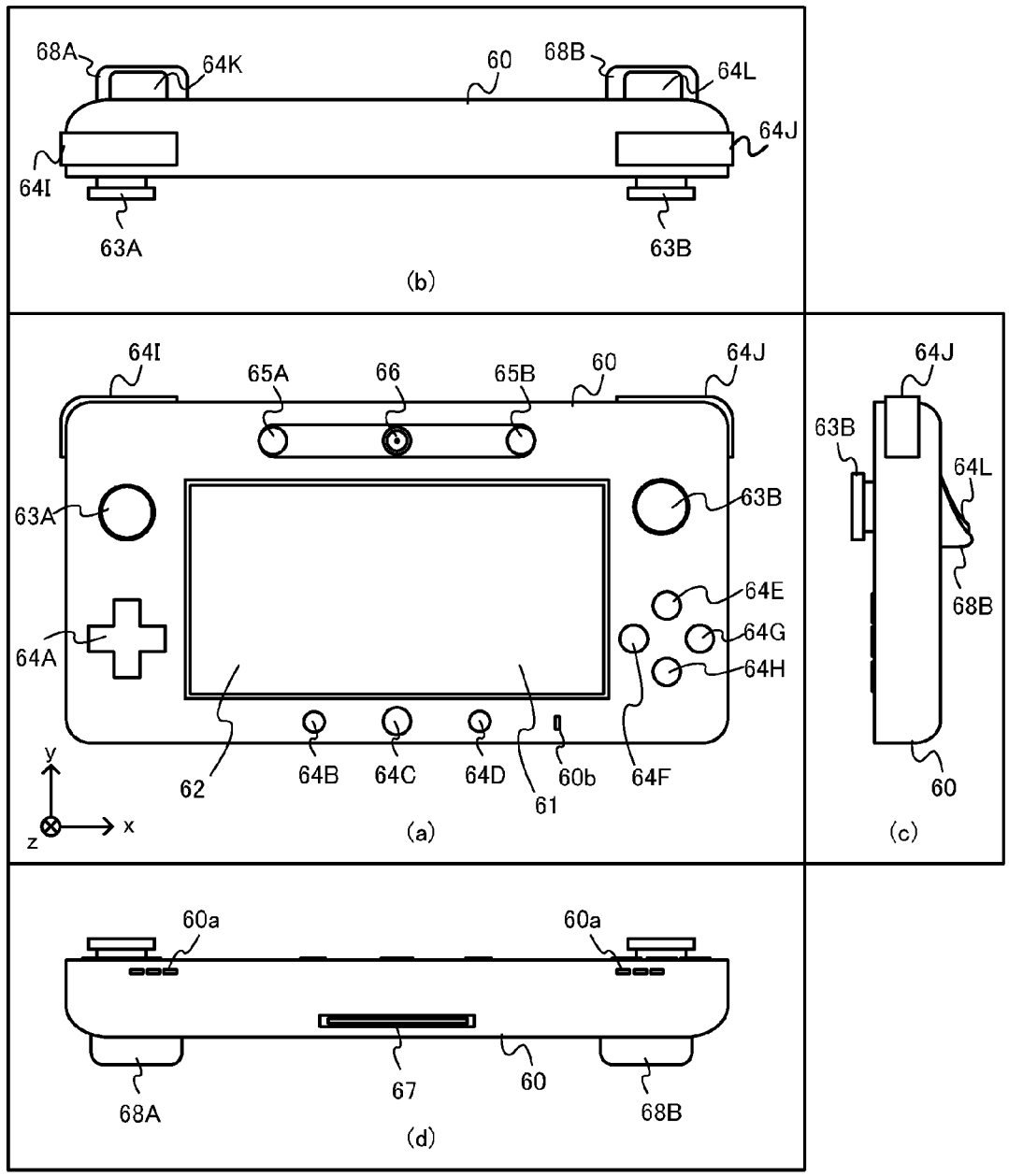
FIG. 3 shows a non-limiting example of the external configuration of a terminal device 6 in FIG. 1.
Figure 4:
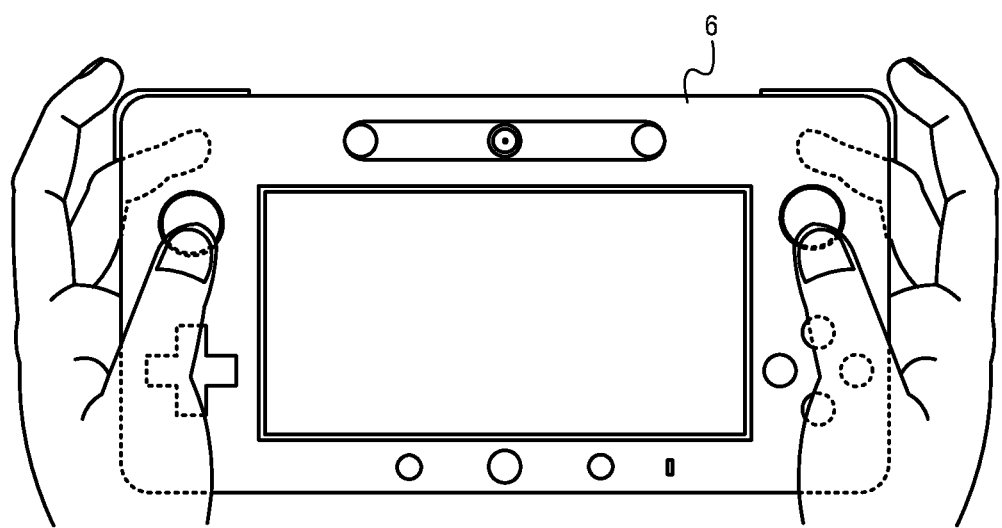
FIG. 4 shows a non-limiting example of a manner in which a user holds the terminal device 6.

Next, a structure of the terminal device 6 will be described with reference to FIG. 3 to FIG. 5. FIG. 3 is a diagram illustrating an example of an external structure of the terminal device 6. More specifically, (a) of FIG. 3 is a front view, (b) of FIG. 3 is a top view, (c) of FIG. 3 is a right side view, and (d) of FIG. 3 is a bottom view of the terminal device 6. FIG. 4 shows an example of a state in which a user holds the terminal device 6 with both hands.

As shown in FIG. 3, the terminal device 6 includes a housing 60 which generally has a horizontally long plate-like rectangular shape. The housing 60 is small enough to be held by the user.

The terminal device 6 includes the LCD 61 on a front surface of the housing 60. The LCD 61 is provided near the center of the front surface of the housing 60. Therefore, as shown in FIG. 4, the user, holding the housing 60 at portions to the right and left of the LCD 61, is allowed to move the terminal device 6 while viewing a screen of the LCD 61.

As shown in (a) of FIG. 3, the terminal device 6 includes, as operation means, a touch panel 62 on the screen of the LCD 61. In the exemplary embodiment, the touch panel 62 is, but is not limited to, a resistive film type touch panel, and a touch panel of any type, such as electrostatic capacitance type, may be used. The touch panel 62 may be of single touch type or multiple touch type. In the exemplary embodiment, the touch panel 62 has the same resolution (detection accuracy) as that of the LCD 61. However, the resolution of the touch panel 62 and the resolution of the LCD 61 need not be the same. Since the terminal device 6 has the touch panel 62, the user is allowed to operate the touch panel 62 while moving the terminal device 6. That is, the user is allowed to directly (by using the touch panel 62) perform an input onto the screen of the LCD 61 while moving the LCD 61.

As shown in FIG. 3, the terminal device 6 has, as operation means, two analog sticks 63A and 63B, and a plurality of operation buttons 64A to 64L. The analog sticks 63A and 63B are each a device for designating a direction. The analog sticks 63A and 63B are each configured such that a stick part thereof to be operated by a finger of the user is slidable or tiltable in any direction (at any angle in any direction such as the upward, the downward, the rightward, the leftward, or the diagonal direction) with respect to the front surface of the housing 60.

The respective operation buttons 64A to 64L are assigned functions, according to need, in accordance with a game program. For example, the cross button 64A may be used for direction designation operation, selection operation, and the like; and the operation buttons 64E to 64H may be used for determination operation, cancellation operation, and the like.

As shown in (a) of FIG. 3, the terminal device 6 includes a marker section (the marker section 65 shown in FIG. 5) including a marker 65A and a marker 65B, on the front surface of the housing 60. The markers 65A and 65B are each constituted by one or more infrared LEDs. The marker section 65 is used, like the marker 8, for causing the game apparatus body 5 to calculate a movement or the like of the controller 7 with respect to the marker section 65. The game apparatus body 5 is capable of controlling the infrared LEDs of the marker section 65 to be turned on or off.

The terminal device 6 includes the camera 66. The camera 66 is disposed on the surface of the housing 60. Accordingly, the camera 66 is capable of taking an image of the face of the user holding the terminal device 6. For example, the camera 66 can take an image of the user who is playing a game while viewing the LCD 61.

The terminal device 6 has a microphone (a microphone 609 shown in FIG. 5) as sound input means. The microphone 609 is embedded in the housing 60 at a position inside the microphone hole 60b. The microphone 609 detects for a sound, such as user's voice, around the terminal device 6.

Figure 5:
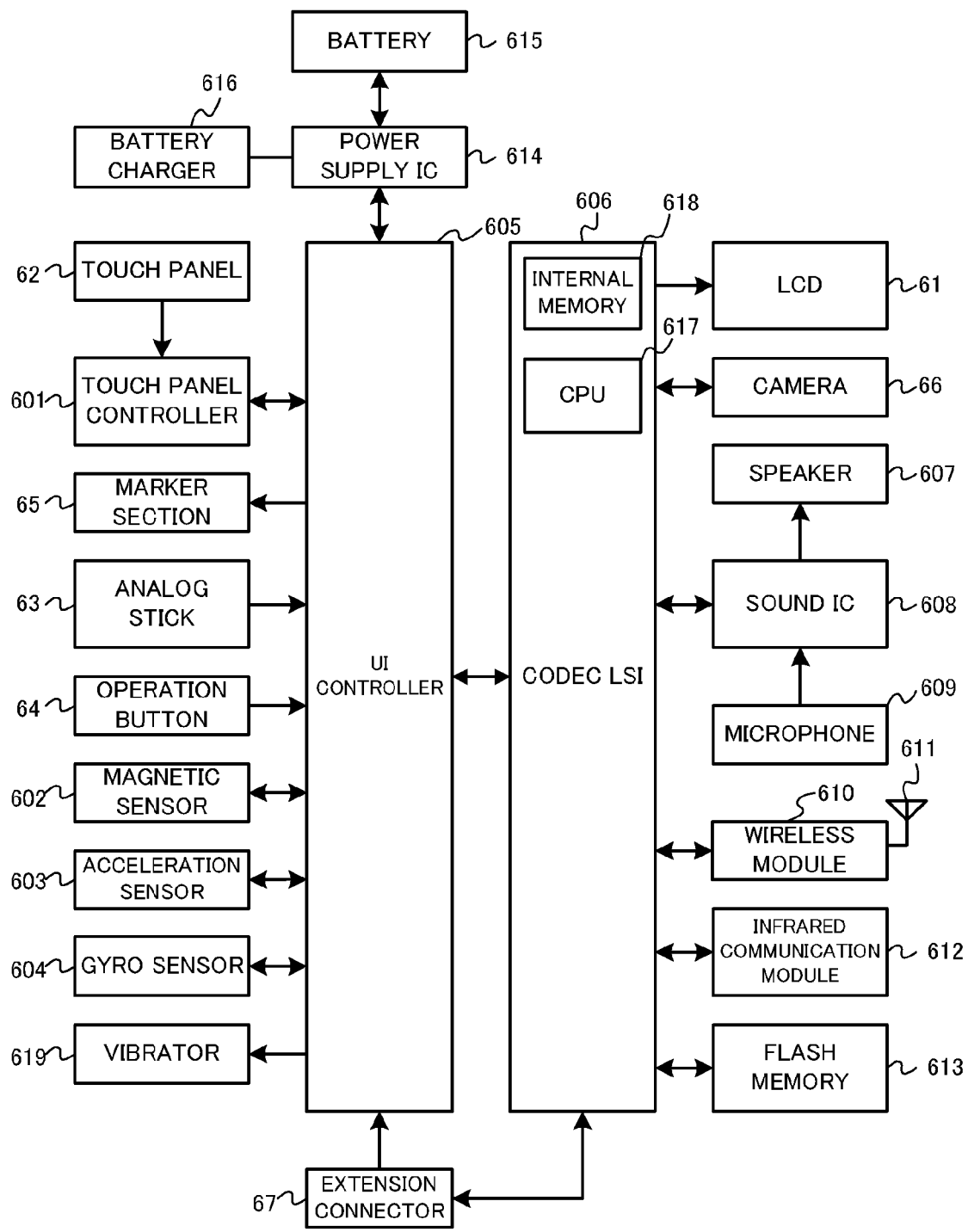
FIG. 5 is a block diagram showing a non-limiting example of the internal configuration of the terminal device 6 in FIG. 3.

The terminal device 6 has loudspeakers (loudspeakers 607 shown in FIG. 5). Sound from the loudspeakers 607 is outputted from loudspeaker holes 60a provided on the lower side surface of the housing 60.

The terminal device 6 includes an extension connector 67 for connecting other devices to the terminal device 6.

In the terminal device 6 shown in FIG. 3, the shapes of the operation buttons and the housing 60, the number of the respective components, and the positions in which the components are provided are merely examples. The shapes, numbers, and positions may be different from those described above.

Next, an internal structure of the terminal device 6 will be described with reference to FIG. 5. FIG. 5 is a block diagram illustrating an example of an internal structure of the terminal device 6. As shown in FIG. 5, the terminal device 6 includes, in addition to the components shown in FIG. 3, a touch panel controller 601, a magnetic sensor 602, an acceleration sensor 603, the gyro sensor 604, a user interface controller (UI controller) 605, a codec LSI 606, loudspeakers 607, a sound IC 608, a microphone 609, a wireless module 610, an antenna 611, an infrared communication module 612, a flash memory 613, a power supply IC 614, a battery 615, and a vibrator 619. These electronic components are mounted on an electronic circuit board and accommodated in the housing 60.

The UI controller 605 is a circuit for controlling data input to various input/output sections and data output from various input/output sections. The UI controller 605 is connected to the touch panel controller 601, an analog stick 63 (the analog sticks 63A and 63B), the operation button 64 (the operation buttons 64A to 64L), the marker section 65, the magnetic sensor 602, the acceleration sensor 603, the gyro sensor 604, and the vibrator 619. Further, the UI controller 605 is connected to the codec LSI 606 and the extension connector 67. The power supply IC 614 is connected to the UI controller 605, so that power is supplied to the respective components through the UI controller 605. The internal battery 615 is connected to the power supply IC 614, so that power is supplied from the battery 615. Further, a battery charger 616 or a cable, which is supplied with power from an external power supply, may be connected to the power supply IC 614 via a connector or the like. In this case, the terminal device 6 can be supplied with power and charged from the external power supply by using the battery charger 616 or the cable.

The touch panel controller 601 is a circuit which is connected to the touch panel 62 and controls the touch panel 62. The touch panel controller 601 generates a predetermined form of touch position data, based on a signal from the touch panel 62, and outputs the touch position data to the UI controller 605. The touch position data represents coordinates of a position at which an input is performed on an input surface of the touch panel 62. The touch panel controller 601 reads a signal from the touch panel 62 and generates touch position data every predetermined period of time. Further, various control instructions are outputted from the UI controller 605 to the touch panel controller 601.

The analog stick 63 outputs, to the UI controller 605, stick data representing an amount and direction of the sliding (or tilting) of the stick part. The operation button 64 outputs, to the UI controller 605, operation button data representing an input status of each of the operation buttons 64A to 64L (whether or not the operation button is pressed).

The magnetic sensor 602 detects the magnitude and direction of a magnetic field to detect an orientation. Orientation data representing the detected orientation is outputted to the UI controller 605. The UI controller 605 outputs, to the magnetic sensor 602, a control instruction for the magnetic sensor 602. Examples of the magnetic sensor 602 include: an MI (Magnetic Impedance) sensor, a fluxgate sensor, a Hall sensor, a GMR (Giant Magneto Resistance) sensor, a TMR (Tunneling Magneto Resistance) sensor, and an AMR (Anisotropic Magneto Resistance) sensor. However, any sensor may be adopted as long as the sensor can detect an orientation.

The acceleration sensor 603 is provided inside the housing 60. The acceleration sensor 603 detects the magnitudes of linear accelerations in all three axial directions (xyz axial directions shown in (a) of FIG. 3). Acceleration data representing the detected accelerations is outputted to the UI controller 605. The UI controller 605 outputs, to the acceleration sensor 603, a control instruction for the acceleration sensor 603.

The gyro sensor 604 is provided inside the housing 60. The gyro sensor 604 detects the angular velocities around all the three axes (the above-described xyz axes). Angular velocity data representing the detected angular velocities is outputted to the UI controller 605. The UI controller 605 outputs, to the gyro sensor 604, a control instruction for the gyro sensor 604.

The vibrator 619 is, for example, a vibration motor or a solenoid, and the terminal device 6 is vibrated by actuating the vibrator 619 in accordance with a control instruction outputted from the UI controller 605 to the vibrator 619.

The UI controller 605 outputs, to the codec LSI 606, the operation data (hereinafter, referred to as terminal operation data) including the touch position data, the stick data, the operation button data, the orientation data, the acceleration data and the angular velocity data, which have been received from the respective components.

The codec LSI 606 is a circuit for performing a compression process on data to be transmitted to the game apparatus body 5, and a decompression process on data transmitted from the game apparatus body 5. The LCD 61, the camera 66, the sound IC 608, the wireless module 610, the flash memory 613, and the infrared communication module 612 are connected to the codec LSI 606. The codec LSI 606 includes a CPU 617 and an internal memory 618. Although the terminal device 6 is configured not to perform a game process, the terminal device 6 may execute a program for managing the terminal device 6 or a program for communication. For example, a program stored in the flash memory 613 is loaded into the internal memory 618 and executed by the CPU 617 when the terminal device 6 is powered on, thereby starting up the terminal device 6. A part of the area of the internal memory 618 is used as a VRAM for the LCD 61.

The camera 66 takes an image in accordance with an instruction from the game apparatus body 5, and outputs data of the taken image to the codec LSI 606. The codec LSI 606 outputs, to the camera 66, a control instruction for the camera 66, such as an instruction to take an image. The camera 66 is also capable of taking a moving picture. That is, the camera 66 is capable of repeatedly performing image taking, and repeatedly outputting image data to the codec LSI 606.

The sound IC 608 is a circuit for controlling input of sound data to the microphone 609 and output of sound data from the loudspeakers 607.

The codec LSI 606 transmits the image data from the camera 66, the sound data from the microphone 609, and the terminal operation data from the UI controller 605 to the game apparatus body 5 via the wireless module 610. In the exemplary embodiment, the codec LSI 606 subjects the image data and the sound data to a compression process similar to that performed by the codec LSI 27. The compressed image data and sound data, and the terminal operation data are outputted to the wireless module 610 as transmission data. The antenna 611 is connected to the wireless module 610, and the wireless module 610 transmits the transmission data to the game apparatus body 5 through the antenna 611. The wireless module 610 has the same function as the terminal communication module 28 of the game apparatus body 5. That is, the wireless module 610 has a function of connecting to a wireless LAN by a method based on, for example, the IEEE802.11n standard.

As described above, the transmission data transmitted from the terminal device 6 to the game apparatus body 5 includes the terminal operation data, the image data, and the sound data. If another device is connected to the terminal device 6 through the extension connector 67, data received from the other device may be included in the transmission data. The infrared communication module 612 performs, with another device, infrared communication based on, for example, the IRDA standard. The codec LSI 606 may include, in the transmission data, data received by the infrared communication, and transmit the transmission data to the game apparatus body 5, according to need.

As described above, the compressed image data and sound data are transmitted from the game apparatus body 5 to the terminal device 6. These data are received by the codec LSI 606 through the antenna 611 and the wireless module 610. The codec LSI 606 decompresses the received image data and sound data. The decompressed image data is outputted to the LCD 61, and an image according to the image data is displayed on the LCD 61. On the other hand, the decompressed sound data is outputted to the sound IC 608, and a sound based on the sound data is outputted from the loudspeakers 607.

When control data is included in the data received from the game apparatus body 5, the codec LSI 606 and the UI controller 605 provide control instructions for the respective components, according to the control data. As described above, the control data represents control instructions for the respective components (in the exemplary embodiment, the camera 66, the touch panel controller 601, the marker section 65, the sensors 602 to 604, the vibrator 619, and the infrared communication module 612) included in the terminal device 6. In the exemplary embodiment, the control instructions represented by the control data are considered to be instructions to start and halt (stop) the operations of the above-mentioned components. That is, some components which are not used for a game may be halted to reduce power consumption. In this case, data from the halted components are not included in the transmission data transmitted from the terminal device 6 to the game apparatus body 5.

Next, one example of a game executed the game system of the exemplary embodiment will be described with reference to FIG. 6 to FIG. 18.

Figure 6:
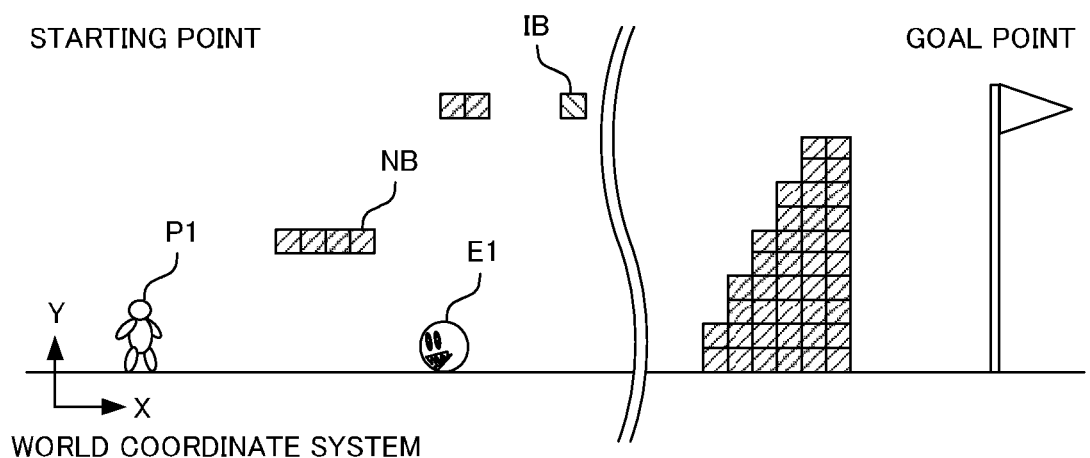
FIG. 6 shows a game world.

An objective of this game for a player is to operate the controller 7 and to control a player character to reach a goal point in a game world (a two dimensional virtual space) as shown in FIG. 6.

As shown in FIG. 6, for example, a player character P1, an enemy character E1, a normal block NB, an item block IB, and the like exist in the game world.

The player character P1 is a character that is to be controlled by the player. The enemy character E1 is controlled by a computer based on a predetermined algorithm.

A normal block NB can be used as a foothold for the player character P1. By hitting a normal block NB from below, the player character P1 can destroy the normal block NB.

The appearance of an item block IB is same as a normal block NB, but is a block that has some kind of item (e.g., an item that allows the player character P1 to be in an invincible state for a predetermined period of time) hidden therein. An item hidden in the item block IB emerges when the player character P1 hits the item block IB from below.

In this game, while one or more players (main player(s)) are playing the game by controlling respective player characters by using the respective controllers 7, another player (sub player) can assist the main player(s) by generating various events in the game world by using the terminal device 6. In the following, an assisting operation by the sub player through a use of the terminal device 6 will be specifically described.

Figure 7:
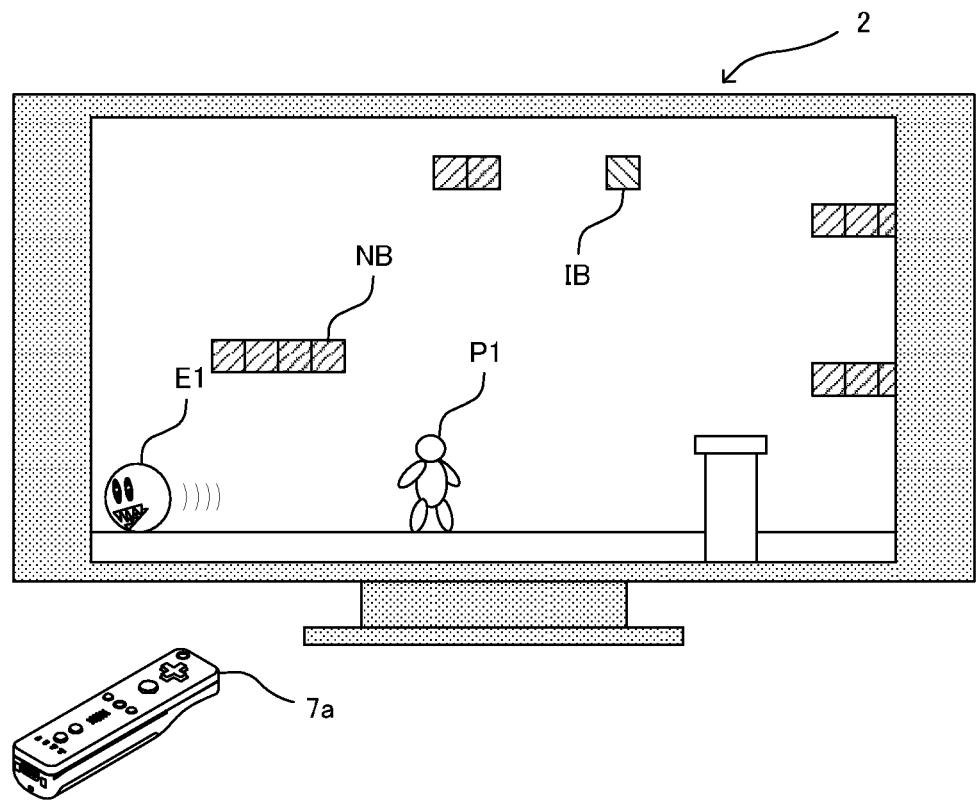
FIG. 7 shows a non-limiting example of a monitor game image displayed on a monitor 2.

FIG. 7 shows one example of a monitor game image displayed on the monitor 2 when a certain player (hereinafter, referred to as a player A) is playing the game by using a controller 7a to control the player character P1. The main player operates the controller 7 while viewing the monitor game image displayed on the monitor 2.

Figure 8:
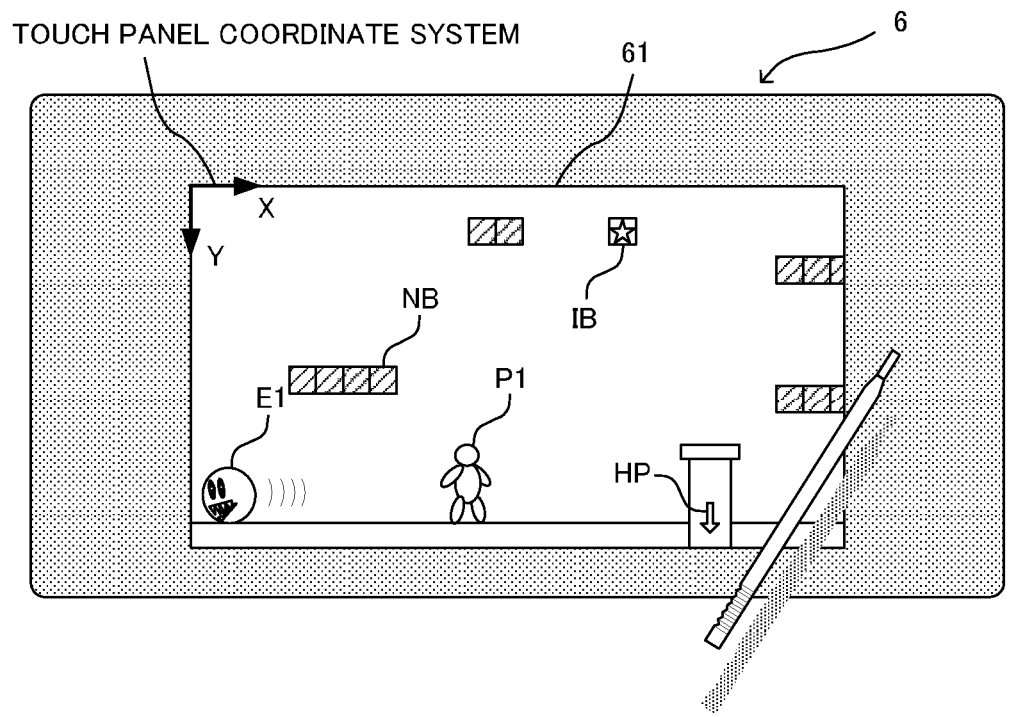
FIG. 8 shows a non-limiting example of a terminal game image displayed on an LCD 61.

FIG. 8 shows a terminal game image displayed on the LCD 61 of the terminal device 6 at the same time when the monitor game image in FIG. 7 is displayed on the monitor 2. The sub player operates the terminal device 6 while viewing the terminal game image displayed on the LCD 61.

As it is obvious when FIG. 7 and FIG. 8 are compared, a game image that is substantially identical to the monitor game image viewed by the main player is displayed on the LCD 61. More specifically, an image of the same game world viewed from the same direction is displayed on the monitor game image and the terminal game image, and a display range of the game world displayed in the monitor game image and a display range of the game world displayed in the terminal game image are nearly the same.

The difference between the monitor game image in FIG. 7 and the terminal game image in FIG. 8 is that an item hidden in an item block IB is not displayed in the monitor game image whereas the item hidden in the item block IB is displayed in the terminal game image. As a result, the main player does not know which item is hidden in which block until a block is hit from below. However, the sub player knows in advance which item is hidden in which block. In addition, an arrow HP indicating a hidden passage (a passage that cannot be viewed on the monitor game image) is displayed on the terminal game image.

By touching the touch panel 62 of the terminal device 6, the sub player can generate various events at a position corresponding to the touched position in the game world.

For example, when nothing exists at the position in the game world corresponding to the touched position, a new normal block NB can be placed at that position. In another embodiment, a block that is different from a normal block NB may be placed. Furthermore, when the enemy character exists at the position in the game world corresponding to the touched position, the movement of the enemy character can be stopped. In addition, when a normal block NB exists at the position in the game world corresponding to the touched position, that normal block NB can be destroyed.

Figure 9:
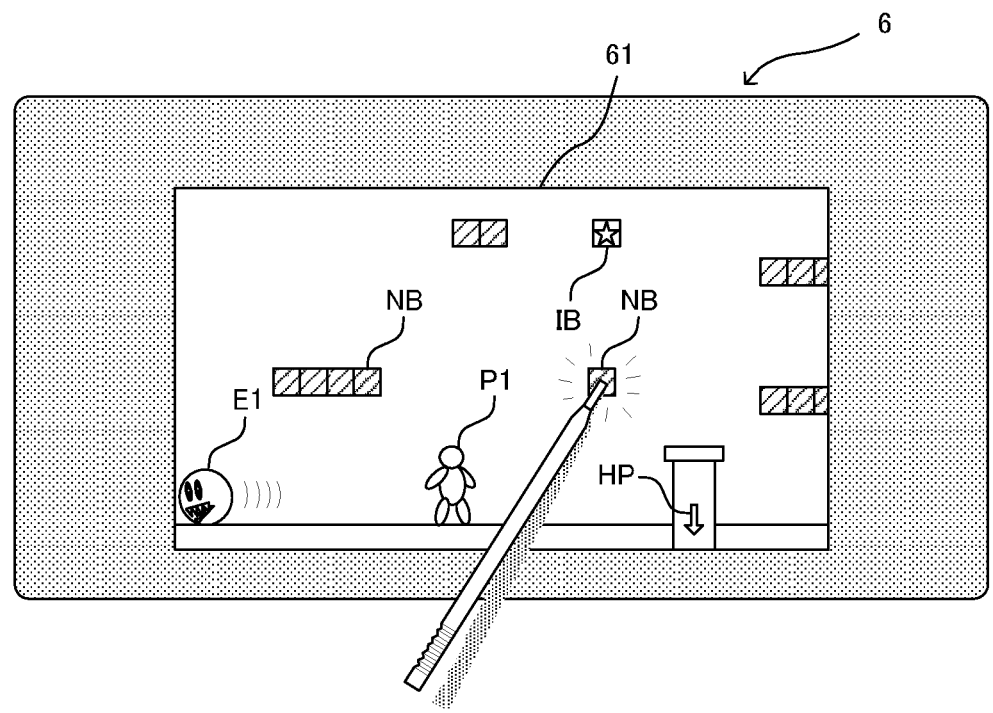
FIG. 9 shows a non-limiting example of the terminal game image displayed on the LCD 61.
Figure 10:
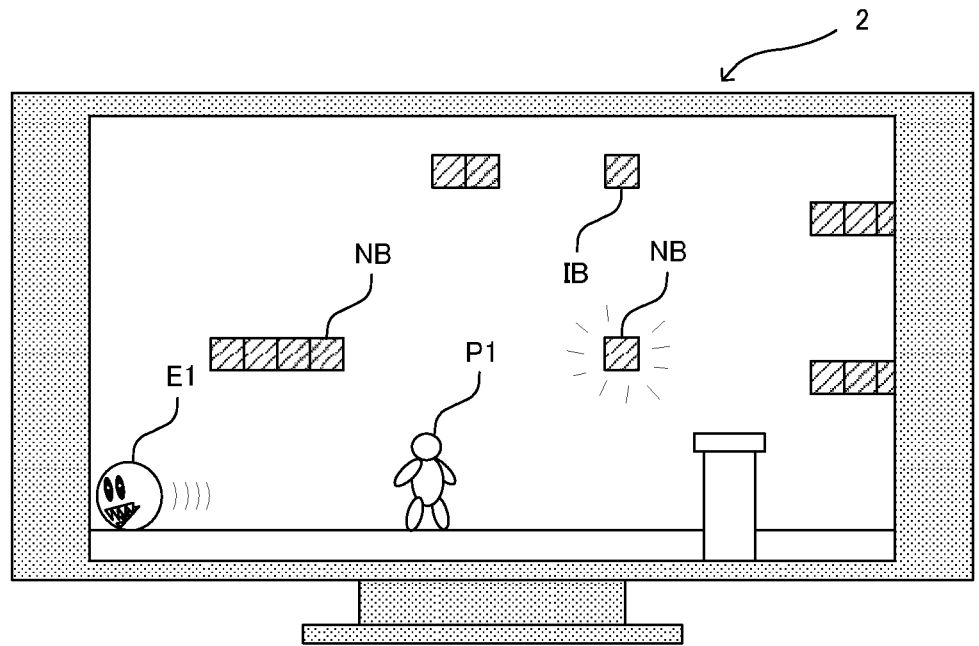
FIG. 10 shows a non-limiting example of the monitor game image displayed on the monitor 2.

For example, in order to allow the player character P1 to obtain an item hidden in an item block IB, the sub player can place a new normal block NB by touching a position below the item block IB where there are no other objects as shown in FIG. 9. When the sub player places a new normal block NB in the game world, the normal block NB will also appear in the monitor game image viewed by the main player as shown in FIG. 10. As a result, the main player can use that normal block NB as a foothold and have the item hidden in the item block IB appear as shown in FIG. 11.

Figure 11:
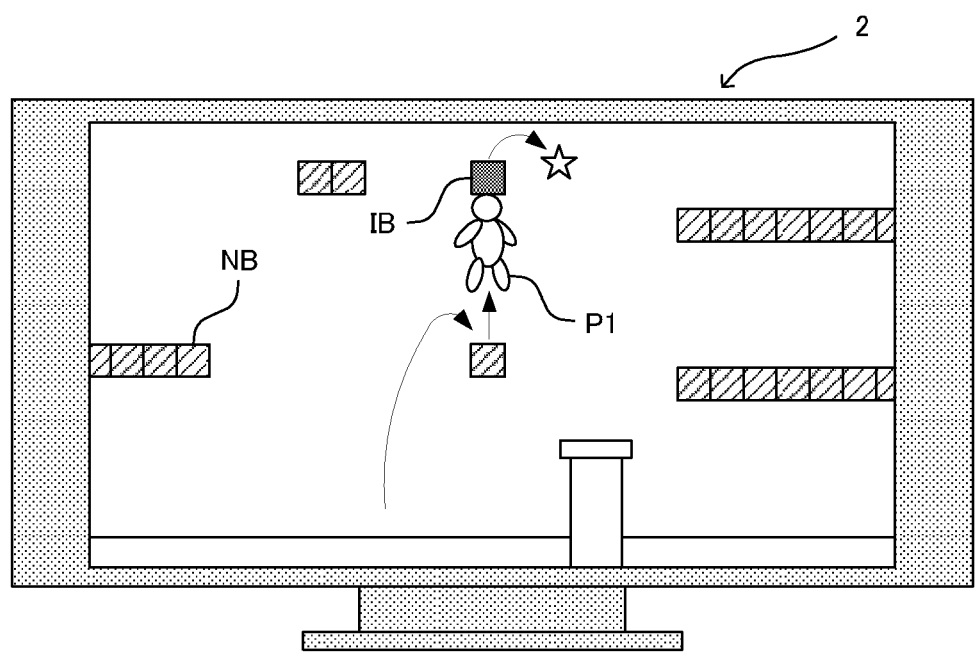
FIG. 11 shows a non-limiting example of the monitor game image displayed on the monitor 2.
Figure 12:
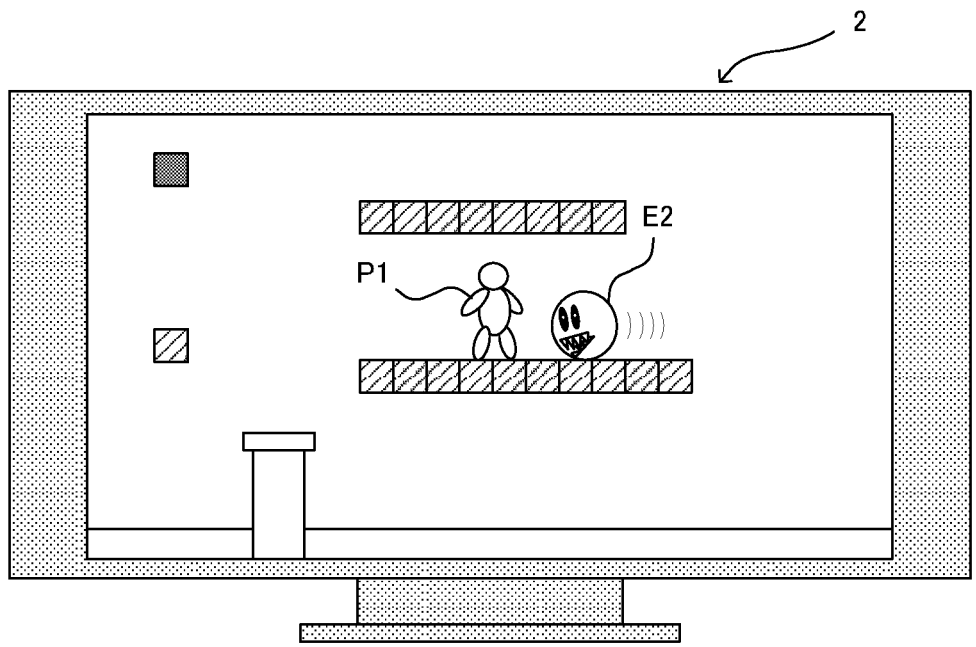
FIG. 12 shows a non-limiting example of the monitor game image displayed on the monitor 2.

FIG. 12 shows a monitor game image obtained when the player character P1 has advanced slightly toward the goal point from the state in FIG. 11. As can be understood from the figure, the game world displayed in the monitor 2 has been scrolled as a result of the player character P1 advancing toward the goal point. Furthermore, FIG. 13 shows a terminal game image displayed on the LCD 61 of the terminal device 6 at the same time point when the monitor game image in FIG. 12 is displayed on the monitor 2.

Figure 13:
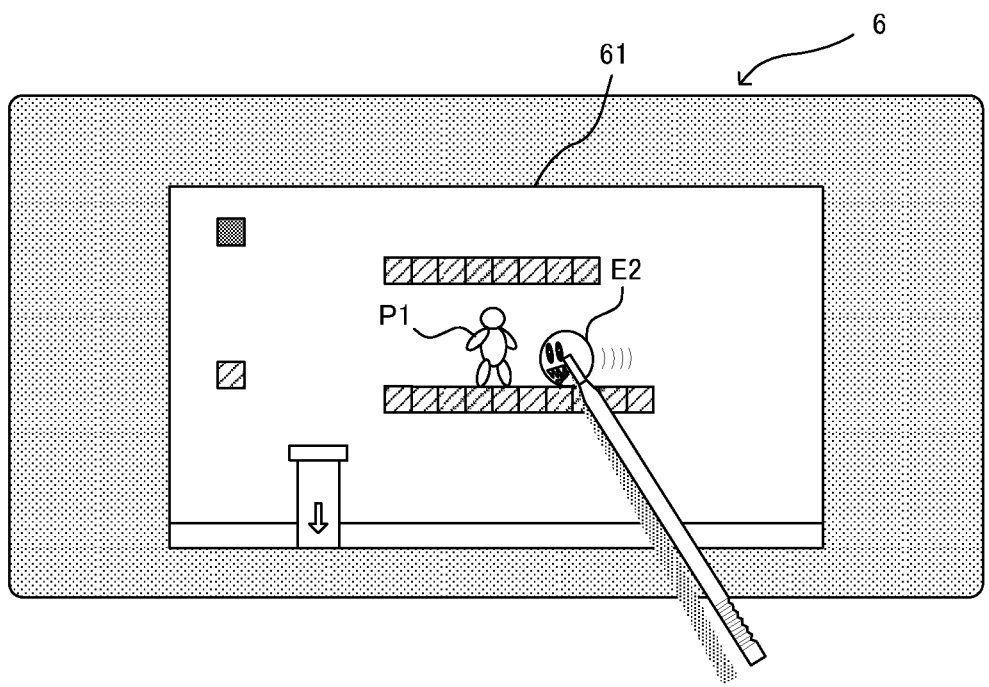
FIG. 13 shows a non-limiting example of the terminal game image displayed on the LCD 61.
Figure 14:
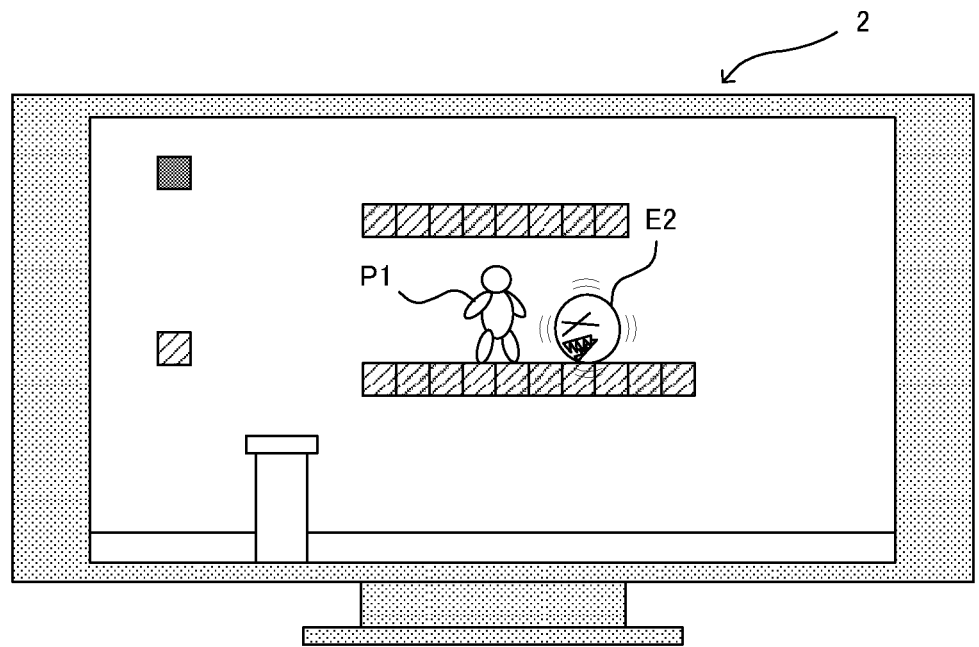
FIG. 14 shows a non-limiting example of the monitor game image displayed on the monitor 2.
Figure 15:
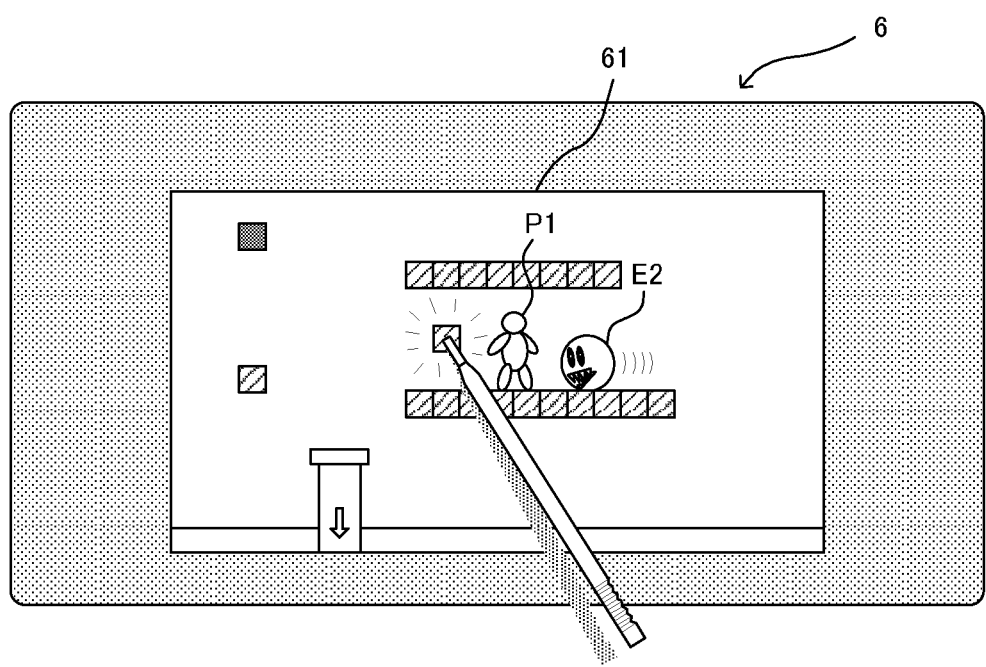
FIG. 15 shows a non-limiting example of the terminal game image displayed on the LCD 61.

In FIG. 12 and FIG. 13 an enemy character E2 is approaching the player character P1. Here, in order to assist the main player, the sub player touches the enemy character E2 as shown in FIG. 13, and the movement of the enemy character E2 stops as shown in FIG. 14.

Instead of assisting the main player, the sub player can also obstruct the main player. For example, the sub player can obstruct the player character P1 from escaping toward the left direction by placing a new normal block NB at a position show in FIG. 15.

In such manner, in this game, the sub player can assist or obstruct the progress of the game played by the main player, by touching a desired position in the game world displayed in the LCD 61 and generating a predetermined event at the touched position.

As shown in FIG. 7 to FIG. 15, although the display range of the game world displayed in the terminal game image and the display range of the game world displayed in the monitor game image are basically identical, these display ranges can be shifted from the other.

Figure 16:
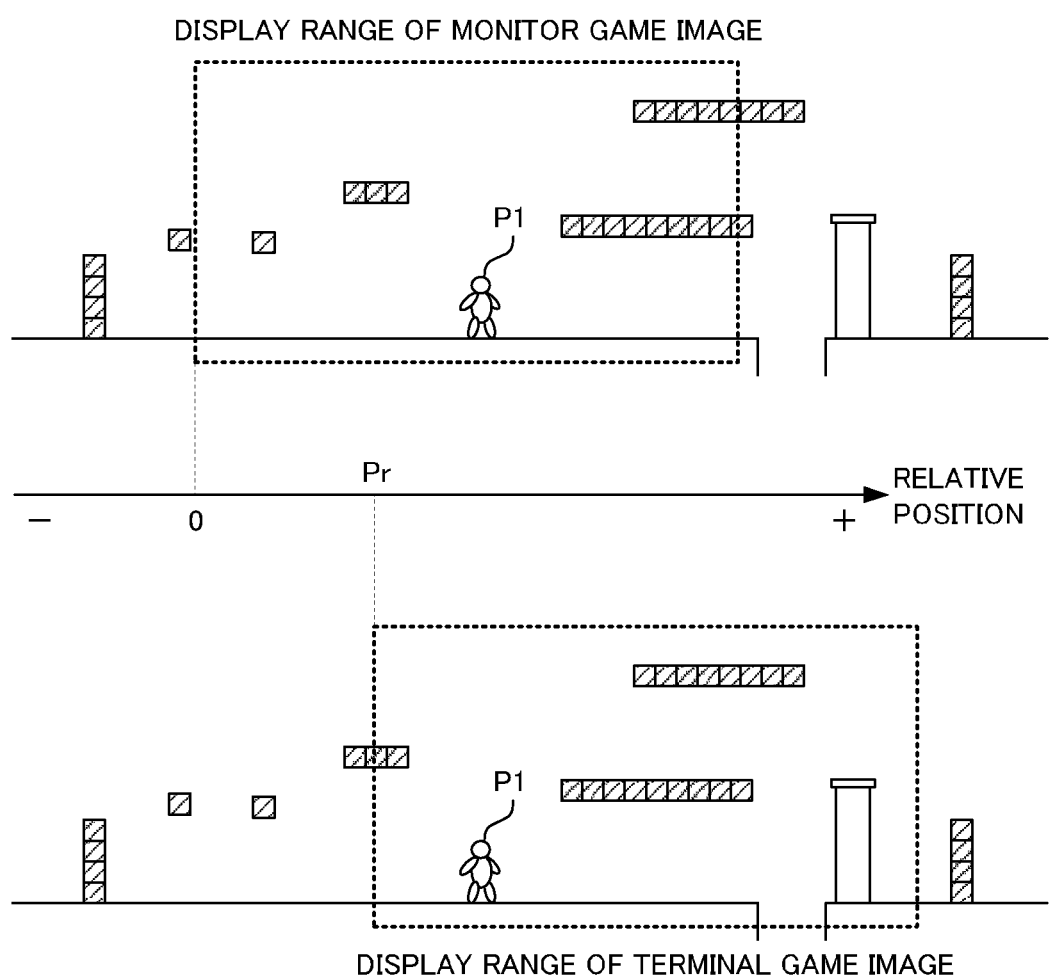
FIG. 16 shows a non-limiting example of a relative position of a display range of a game world displayed in the terminal game image with respect to a display range of the game world displayed in the monitor game image.
Figure 17:
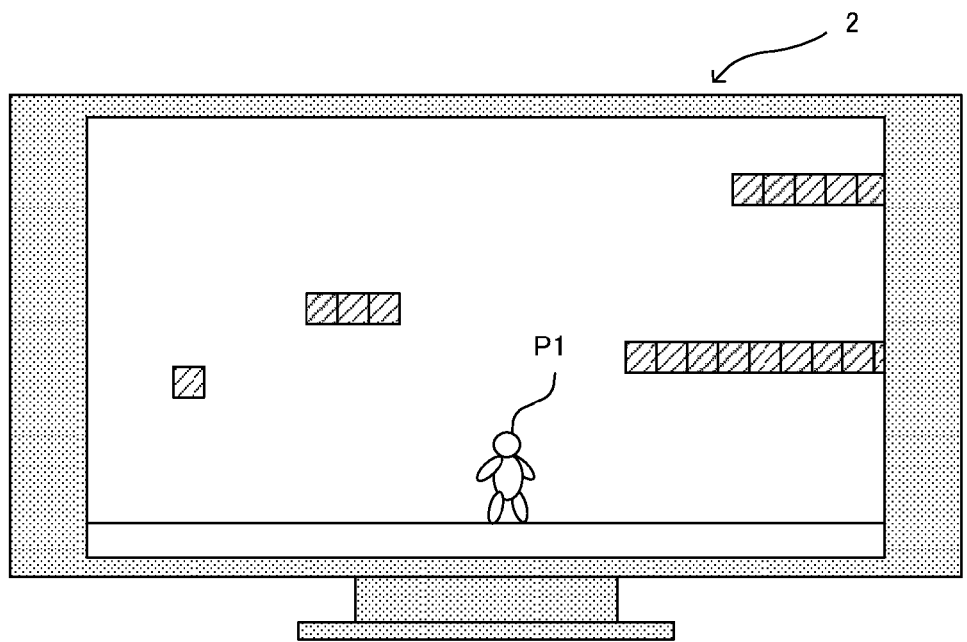
FIG. 17 shows a non-limiting example of the monitor game image displayed on the monitor 2.
Figure 18:
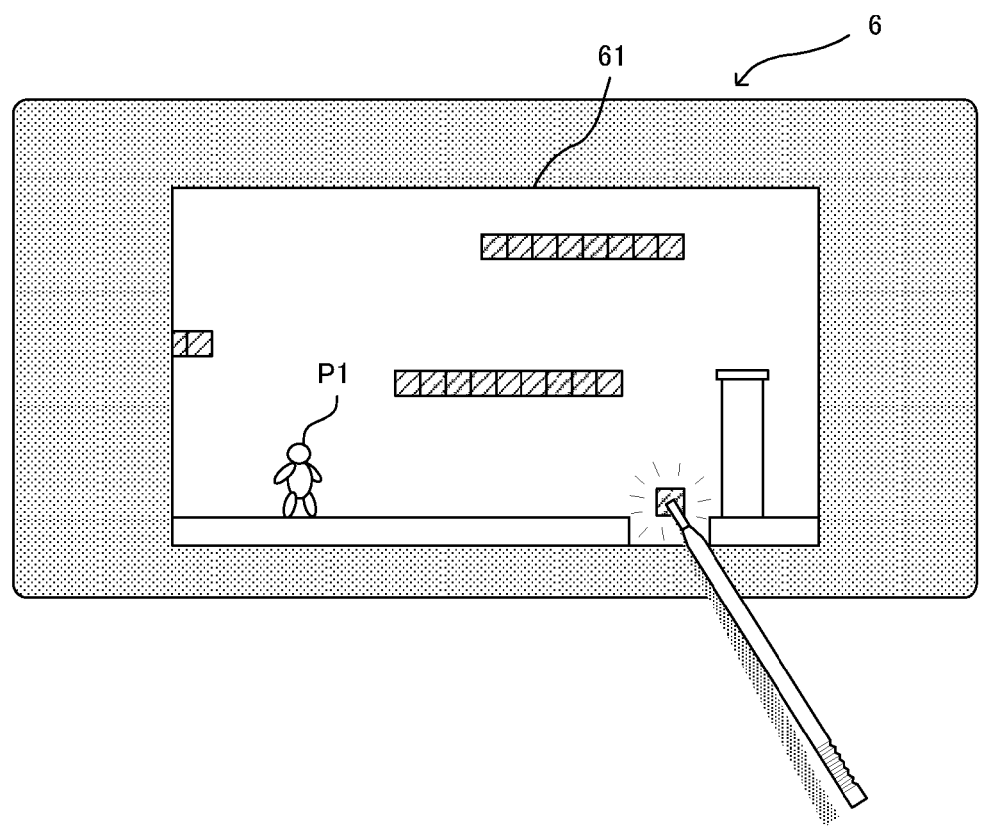
FIG. 18 shows a non-limiting example of the terminal game image displayed on the LCD 61.

For example, as shown in FIG. 16, the display range of the game world displayed in the terminal game image may be set forward (i.e., in a direction toward the goal point) by a distance Pr from the display range of the game world displayed in the monitor game image. As a result, displayed on the LCD 61 is a range (as seen in FIG. 18) slightly in front of a range (as seen in FIG. 17) displayed on the monitor 2, and the sub player can view the game world ahead of the main player and provide assistance such as installing a normal block NB that can be used as a foothold.

In the exemplary embodiment, by moving the terminal device 6 in the right or left direction, the sub player can change a relative position (i.e., the value of Pr shown in FIG. 16) of a display range of the game world displayed in the terminal game image with respect to a display range of the game world displayed in the monitor game image. Specifically, with respect to a display range of the game world displayed in the monitor game image, when the terminal device 6 is moved rightward, the relative position of the display range of the game world displayed in the terminal game image shifts in the rightward direction (i.e., the direction toward the goal point), and when the terminal device 6 is moved leftward, the relative position shifts in the leftward direction (i.e., the direction toward the starting point). The movement of the terminal device 6 can be detected by, for example, the acceleration sensor 603.

Next, detailed action of the game system to achieve the game will be described with reference to FIG. 19 to FIG. 22.

Figure 19:
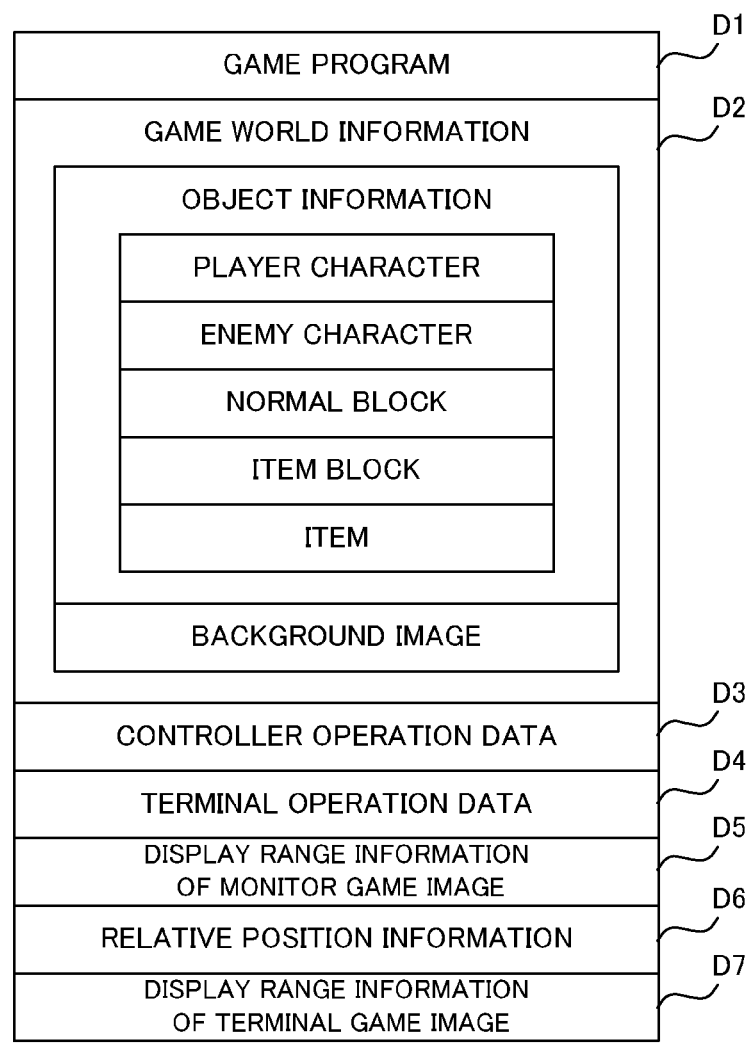
FIG. 19 is a non-limiting example of a memory map of an external main memory 12.

FIG. 19 shows one example of various data stored in the external main memory 12 of the game apparatus body 5 when the game is executed.

A game program D1 is a program that causes the CPU 10 of the game apparatus body 5 to execute a game process for achieving the game. The game program D1 is loaded, for example, from the optical disc 4 to the external main memory 12.

Game world information D2 is information that defines the game world. The game world information D2 includes, for example, information regarding positions, attitudes, conditions, and the like of various objects (player characters, enemy characters, normal blocks, item blocks, items, and the like) in the game world, information regarding images and the like, and information regarding background images. In the exemplary embodiment, the game world is a two dimensional virtual space, and thereby positions of various objects in the game world are represented by, for example, two-dimensional coordinates of a world coordinate system shown in FIG. 6.

Controller operation data D3 is operation data that is periodically transmitted from the controller 7. When multiple main players are to simultaneously play the game by using multiple controllers 7 among the controllers 7a, 7b, 7c, and 7d; controller operation data from the multiple controllers 7 are stored in the external main memory 12 so as to be distinguishable from each other.

Terminal operation data D4 is operation data that is periodically transmitted from the terminal device 6. As described above, the terminal operation data D4 includes the touch position data, the acceleration data, and the like.

Display range information D5 of the monitor game image is information representing a display range of a game world displayed in the monitor game image. The display range information D5 of the monitor game image is represented, for example, by an X coordinate value in the world coordinate system shown in FIG. 6.

Relative position information D6 is information representing a relative position of a display range of the game world displayed in the terminal game image with respect to a display range of the game world displayed in the monitor game image. The relative position information D6 is represented, for example, by a value of Pr shown in FIG. 16.

Display range information D7 of the terminal game image is information representing a display range of the game world displayed in the terminal game image. The display range information D7 of the terminal game image is represented, for example, by an X coordinate value in the world coordinate system shown in FIG. 6.

Next, a flow of the game process executed by the CPU 10 of the game apparatus body 5 based on the game program D1 will be described with reference to flowcharts in FIG. 20 to FIG. 22.

Figure 20:
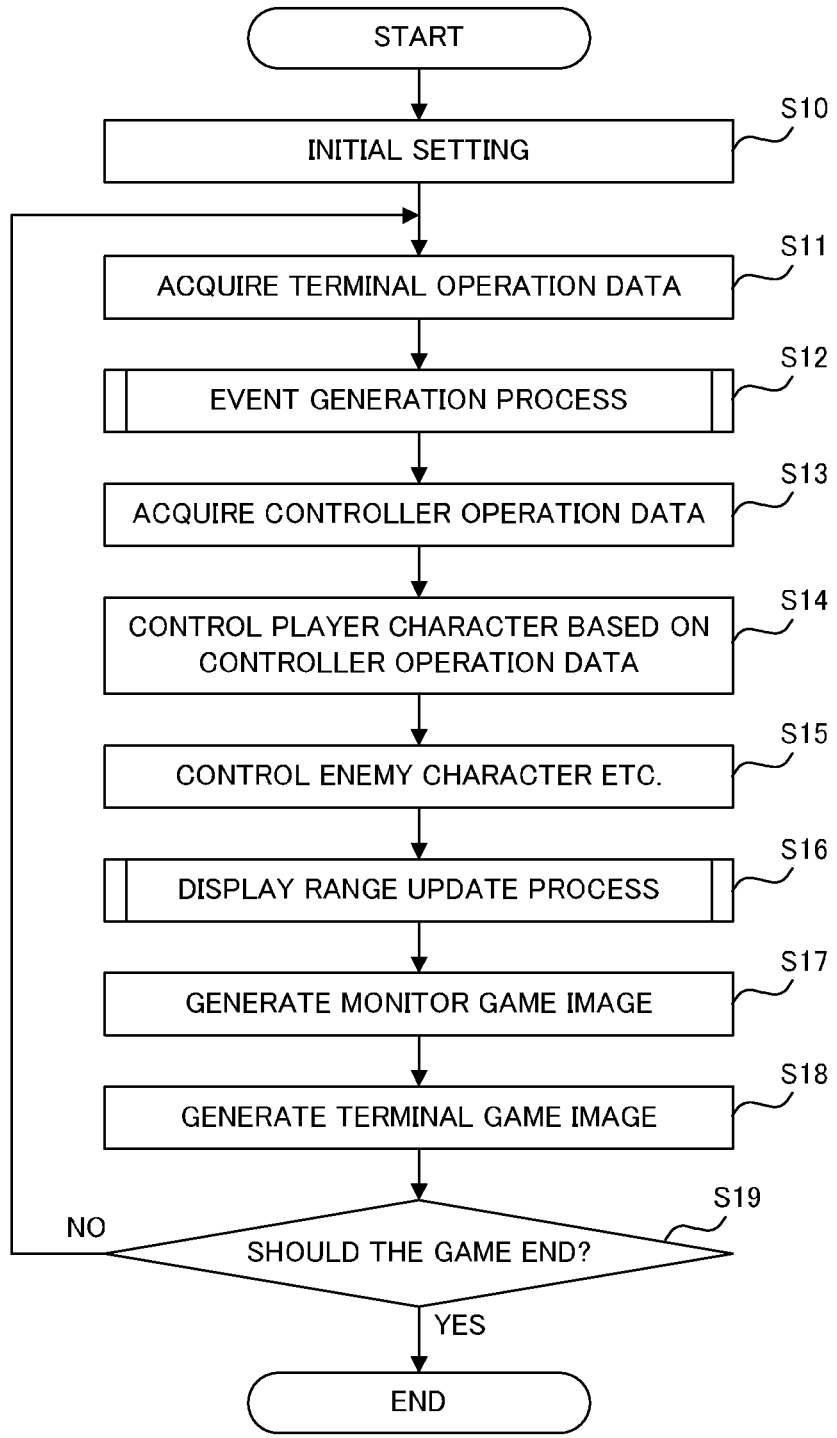
FIG. 20 is a non-limiting example of a flowchart showing a flow of a game process based on a game program D1.

When execution of the game program D1 is initiated, first, at step S10 in FIG. 20, the CPU 10 sets up initial settings. In the initial settings, a process for setting a position of a player character to an initial position, processes for setting, to initial values, the display range information D5 of the monitor game image, the relative position information D6, and the display range information D7 of the terminal game image, and the like are conducted.

At step S11, the CPU 10 acquires the terminal operation data D4 from the terminal device 6.

At step S12, the CPU 10 executes an event generating process. In the following, details of the event generating process will be described with reference to the flowchart in FIG. 21.

When the event generating process is initiated, first, at step S20, the CPU 10 converts the touch position data included in the terminal operation data D4 into world coordinates. The conversion is conducted based on the display range information D7 of the terminal game image. With this, a position in the game world corresponding to a position on the LCD 61 where the sub player has touched is determined.

At step S21, the CPU 10 compares the world coordinates obtained through the conversion at step S20 to position information of each object included in the game world information D2, and determines whether the sub player has touched a position in the game world where there are no other objects (i.e., a position absent of various objects such as player characters, enemy characters, normal blocks, and the like). If it is determined that the sub player has touched a position in the game world where there are no other objects, the process advances to step S22; otherwise, the process advances to step S23.

At step S22, the CPU 10 arranges a new normal block NB at the position in the game world where the sub player has touched (i.e., the position in the game world indicated by the world coordinates obtained through the conversion at step S20). Thus, information regarding the new normal block NB is added to the game world information D2.

At step S23, the CPU 10 compares the world coordinates obtained through the conversion at step S20 to position information of each enemy character included in the game world information D2, and determines whether any of the enemy characters has been touched. If it is determined that the sub player has touched any of the enemy characters, the process advances to step S24; otherwise, the process advances to step S25.

At step S24, the CPU 10 stops an enemy character that has been touched by the sub player. More specifically, the information representing the state of the enemy object included in the game world information D2 is changed from a normal state to a stopped state.

At step S25, the CPU 10 compares the world coordinates obtained through the conversion at step S20 to position information of each normal block NB included in the game world information D2, and determines whether the sub player has touched any of the normal blocks NB. If it is determined that the sub player has touched any of the normal blocks NB, the process advances to step S26; otherwise, the event generating process ends.

At step S26, the CPU 10 destroys a normal block NB that has been touched by the sub player. More specifically, the information representing the normal block NB included in the game world information D2 is deleted. Then the event generating process ends.

When the event generating process ends, the process advances to step S13 in FIG. 20.

At step S13, the CPU 10 acquires the controller operation data D3 from the controller 7.

At step S14, the CPU 10 controls a player character based on the controller operation data D3. Specifically, information (position, attitude, state) regarding the player character included in the game world information D2 are changed based on the controller operation data D3.

At step S15, the CPU 10 controls enemy characters etc., in accordance with a predetermined algorithm. Specifically, information (position, attitude, state) regarding the enemy characters included in the game world information D2 are changed in accordance with the predetermined algorithm.

At step S16, the CPU 10 executes a display range update process. In the display range update process, the display range of the game world displayed in the monitor game image and the display range of the game world displayed in the terminal game image are each updated. In the following, details of the display range update process will be described with reference to the flowchart in FIG. 22.

When the display range update process is initiated, first, at step S30, the CPU 10 updates the display range of the game world displayed in the monitor game image based on the current position of the player character. More specifically, the display range information D5 of the monitor game image is updated based on position information of the player character included in the game world information D2. When multiple player characters exist in the game world, the display range information D5 of the monitor game image is updated based on position information of the multiple player characters.

At step S31, the CPU 10 determines whether the terminal device 6 has moved in the rightward direction based on the acceleration data included in the terminal operation data D4. If the terminal device 6 is determined to have moved in the rightward direction, the process advances to step S32; otherwise, the process advances to step S33.

At step S32, the CPU 10 shifts, to the rightward direction (i.e., the direction toward the goal point), the relative position of the display range in the game world displayed in the terminal game image with respect to the display range of the game world displayed in the monitor game image. Specifically, a value of the relative position information D6 is increased in accordance with an amount of movement of the terminal device 6 in the rightward direction. Then, the process advances to step S35.

At step S33, the CPU 10 determines whether the terminal device 6 has moved in the leftward direction based on the acceleration data included in the terminal operation data D4. Then, if the terminal device 6 is determined to have moved in the leftward direction, the process advances to step S34; otherwise, the process advances to step S35.

At step S34, the CPU 10 shifts, to the leftward direction (i.e., the direction toward the starting point), the relative position of the display range in the game world displayed in the terminal game image with respect to the display range of the game world displayed in the monitor game image. Specifically, the value of the relative position information D6 is reduced in accordance with the amount of movement of the terminal device 6 in the leftward direction. Then, the process advances to step S35.

At step S35, the CPU 10 updates the display range of the terminal game image based on the relative position information D6 and the display range information D5 of the monitor game image (i.e., updates the display range information D7 of the terminal game image). Then, the display range update process ends.

When the display range update process ends, the process advances to step S17 in FIG. 20.

At step S17, the CPU 10 generates a monitor game image based on the display range information D5 of the monitor game image and the game world information D2. The generated monitor game image is outputted from the game apparatus body 5 to the monitor 2, and displayed on the monitor 2. One portion or all of the processes for generating the monitor game image may be conducted on the GPU 32 in accordance with an instruction form the CPU 10.

At step S18, the CPU 10 generates a terminal game image based on the display range information D7 of the terminal game image and the game world information D2. The generated terminal game image is outputted from the game apparatus body 5 to the terminal device 6, and displayed on the LCD 61 of the terminal device 6. One portion or all of the processes for generating the terminal game image may be conducted on the GPU 32 in accordance with an instruction from the CPU 10.

Figure 23:
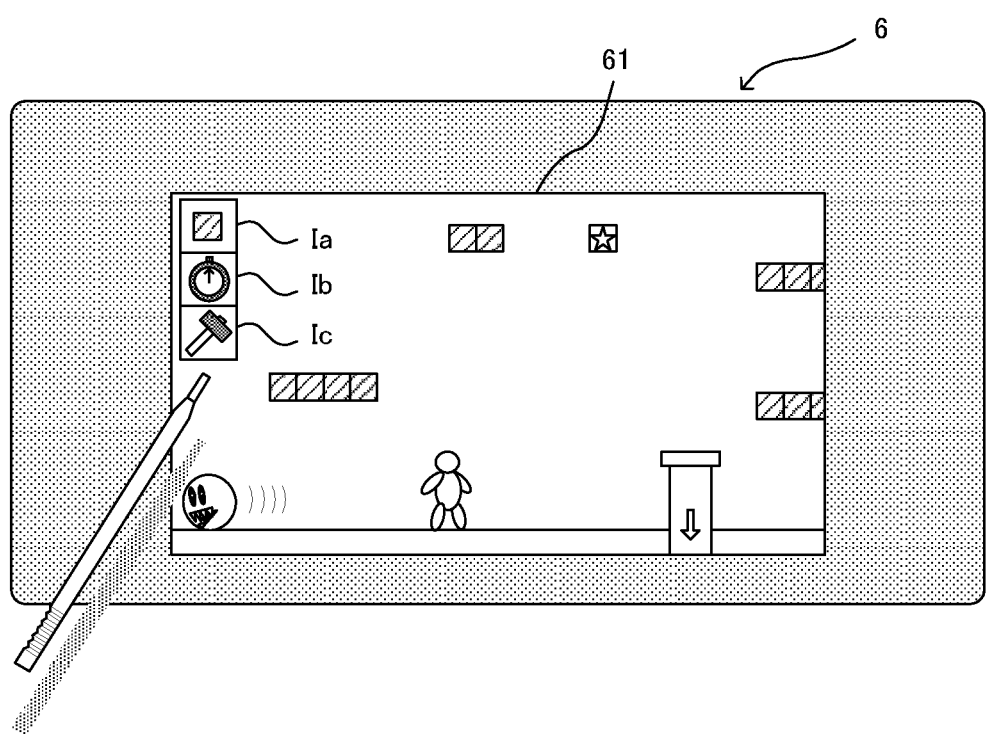
FIG. 23 shows a non-limiting example of the terminal game image displayed on the LCD 61.

A specific object (e.g., the item block IB shown in FIG. 7 and FIG. 8) may have different display modes in the monitor game image generated at step S17 and in the terminal game image generated at step S18. Furthermore, for example, menu icons Ia, Ib, and Ic for the sub player may be displayed only on the terminal game image as shown in FIG. 23.

As described above, in the exemplary embodiment, the same game world is displayed on the monitor 2 viewed by the main player and on the LCD 61 viewed by the sub player, and a predetermined event is generated at a position in the game world instructed by the sub player using the touch panel 62. Therefore, the sub player can assist and/or obstruct the main player.

Furthermore, in the exemplary embodiment, since a screen (the monitor 2) viewed by the main player and a screen (the LCD 61) viewed by the sub player are different, there is no need to display, on the monitor game image, a pointer or a cursor used by the sub player to point a desired position in the game world, and there is no need for the sub player to touch the monitor game image to point a desired position in the game world. Therefore, pointing a desired position in the game world by the sub player can be conducted without disturbing visibility of the monitor game image.

Furthermore, in the exemplary embodiment, since pointing a desired position in the game world by the sub player is conducted by using the touch panel 62, the desired position can be pointed simply and easily.

Furthermore, in the exemplary embodiment, since a substantially identical game image is displayed on the screen (the monitor 2) viewed by the main player and on the screen (the LCD 61) viewed by the sub player, the sub player and the main player can obtain a sensation of playing the same game together.

Furthermore, in the exemplary embodiment, since scrolling of the terminal game image is conducted automatically in accordance with scrolling of the monitor game image, there is no need for the sub player to manually scroll the terminal game image so as to chase the player character.

Furthermore, in the exemplary embodiment, since the sub player can change the relative position of the display range of the game world displayed in the terminal game image with respect to the display range of the game world displayed in the monitor game image, the sub player can change the relative position as appropriate in order to allow easy operation for himself/herself.

Furthermore, since the relative position can be changed by moving the terminal device 60, the sub player can simply and intuitively change the relative position.

Furthermore, in the exemplary embodiment, both images of the monitor game image and the terminal game image are generated by the game apparatus body 5 based on the identical game world information D2. Therefore, there is no possibility of any inconsistencies in the two game images; unlike a case where the two game images are individually generated in different information processing apparatuses, such as, for example, when the monitor game image is generated by the game apparatus body 5 and the terminal game image is generated by the terminal device 6.

Furthermore, in the exemplary embodiment, since the sub player can assist and/or obstruct the main player by using the portable terminal device 6, the sub player can operate the terminal device 6 outside a field of view of the main player. Therefore, the sub player can surprise the main player by generating an event in the game world without being anticipated by the main player beforehand.

It is to be noted that the above described embodiment is merely one example.

For example, although the game world is a two dimensional virtual space in the above described embodiment, the game world may be a three dimensional virtual space in another embodiment.

Furthermore, although the relative position of the display range of the terminal game image changes with respect to the display range of the monitor game image in accordance with a movement of the terminal device 6 in the rightward or leftward direction in the above described embodiment, in another embodiment, the relative position may change in accordance with any movement (e.g., rotation, and the like) of the terminal device 6. Furthermore, in still another embodiment, the relative position may be changed by the operation button 64 provided on the terminal device 6.

Figure 21:
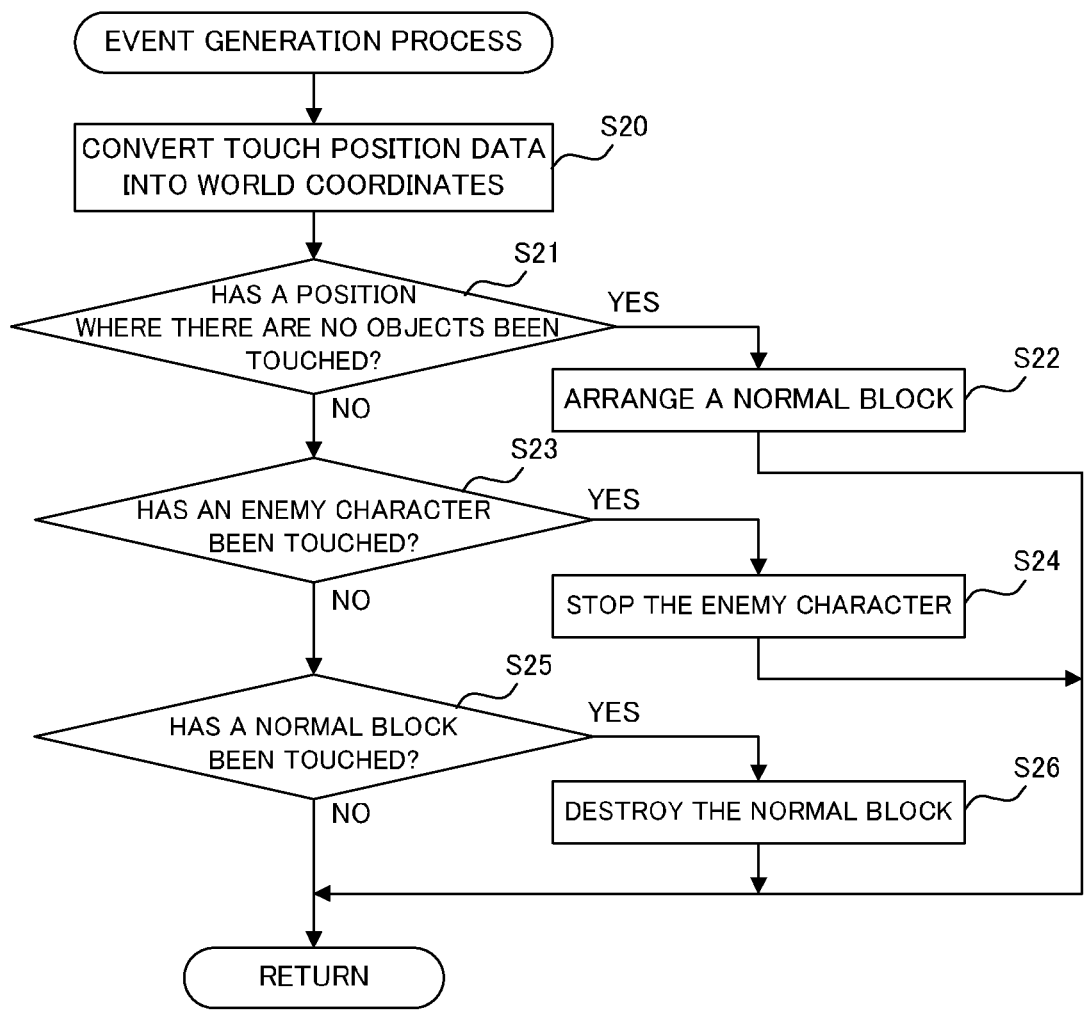
FIG. 21 is a non-limiting example of a flowchart showing a flow of an event generating process.
Figure 22:
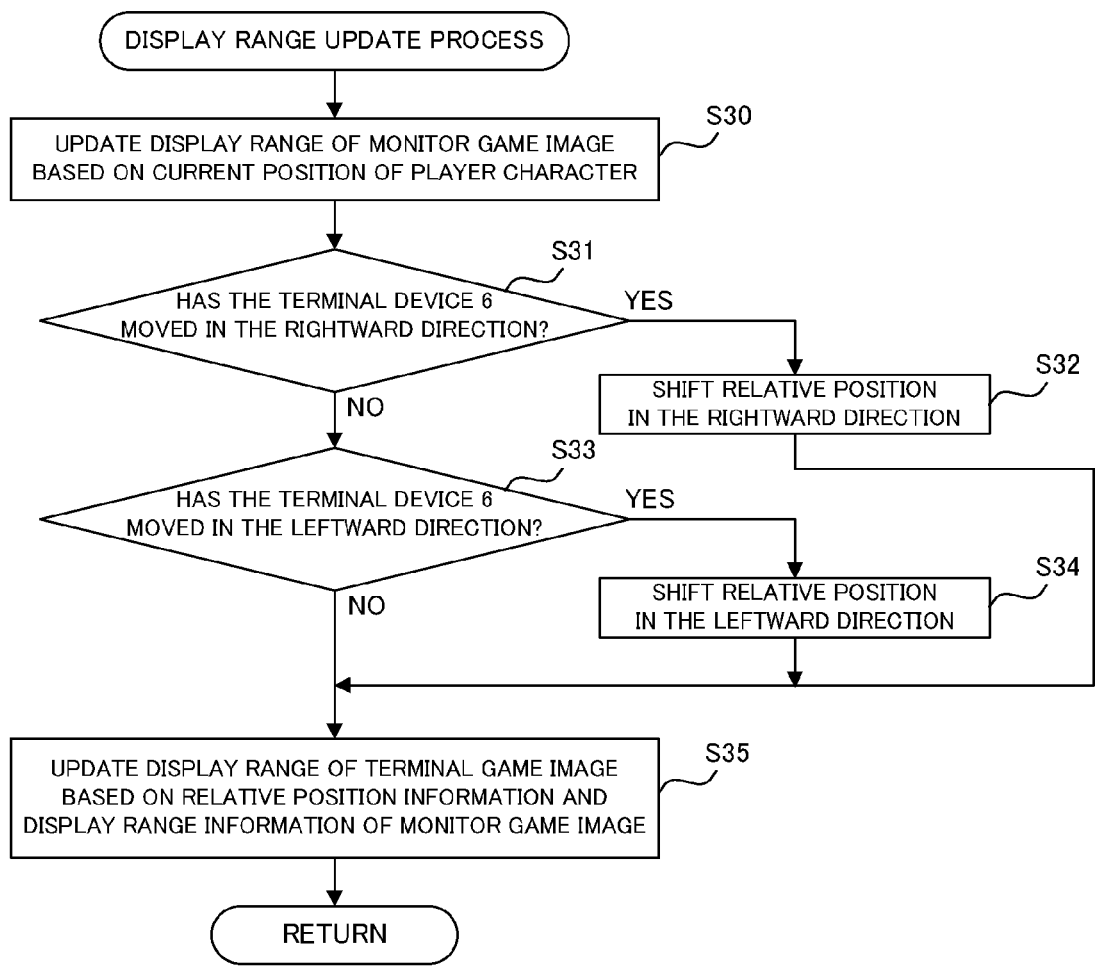
FIG. 22 is a non-limiting example of a flowchart showing a flow of a display range update process.

Furthermore, in the above described embodiment, although the multiple processes shown in FIG. 20 to FIG. 22 are executed on a single computer (the CPU 10), in another embodiment, these multiple processes may be distributed and executed on multiple computers. Furthermore, in still another embodiment, one portion of these multiple processes may be achieved through hardware circuitry.

Furthermore, in the above described embodiment, although the multiple processes shown in FIG. 20 to FIG. 22 are executed on a single information processing apparatus (the game apparatus body 5), in another embodiment, these multiple processes may be distributed and executed on multiple information processing apparatuses (e.g., the game apparatus body 5 and a server device).

Furthermore, in the above described embodiment, although the game program D1 is provided to the game apparatus body 5 from the optical disc 4, in another embodiment, the game program D1 may be provided to the game apparatus body 5 from any other computer readable storage media (e.g., CD-ROM, semiconductor memory, and the like). Furthermore, in still another embodiment, the game program D1 may be stored in advance in a nonvolatile memory (the ROM/RTC 13, the flash memory 17) inside the game apparatus body 5. Furthermore, in still another embodiment, the game program D1 may be transmitted to the game apparatus body 5 from another information processing apparatus (game apparatus, server device).

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

While certain exemplary embodiments has been described in detail, the foregoing description is in all aspects illustrative and not restrictive. It will be understood that numerous other modifications and variations can be devised.

What is claimed is:

1. A non-transitory computer-readable storage medium having stored thereon a game program executed by a computer of a game apparatus for conducting a game process in accordance with (a) an input from a portable display device including a touch panel and a display, and (b) an input from at least one input device, the computer being caused to function as:
   a first input receiver configured to receive an input from the touch panel,
   a second input receiver configured to receive an input from the at least one input device;
   a game processor configured to conduct a predetermined game process based on an input received by the first input receiver from the touch panel and an input received by the second input receiver from the at least one input device;
   an image generator configured to generate a first game image and a second game image of an identical game world in accordance with a game process result obtained by the game processor;
   a first display controller configured to output, to the portable display device, the first game image generated by the image generator; and
   a second display controller configured to output, to a display device that is different from the portable display device and the input device, the second game image generated by the image generator, wherein
   the game processor generates a predetermined event at a position in the game world corresponding to a position on the first game image instructed through the touch panel,
   the first game image and the second game image are game images of the game world viewed from the same direction,
   the game apparatus wirelessly receives input from each of the input device and the portable display device and wirelessly transmits, to the portable display device, data of the first game image generated in accordance with a game process based on the received input, and
   the input device does not display an object operated using the input device, and the object operated using the input device is displayed on the display device that is different from the portable display device and the input device,
   the game processor being further configured to cause a new geographical object to appear at the instructed position when nothing exists in the game world at the instructed position.

2. The non-transitory computer-readable storage medium according to claim 1, wherein the predetermined event includes an event that assists progress of the game conducted based on an input from the at least one input device.

3. The non-transitory computer-readable storage medium according to claim 1, wherein the predetermined event includes an event that obstructs progress of the game conducted based on an input from the at least one input device.

4. The non-transitory computer-readable storage medium according to claim 1, wherein the game processor moves the object within the game world based on an input from the at least one input device.

5. The non-transitory computer-readable storage medium according to claim 4, wherein the game progressed by the game process is a game whose objective is achieved without an input from the portable display device.

6. The non-transitory computer-readable storage medium according to claim 4, wherein
   a movement of a player character in the game world is controlled in accordance with an input from the at least one input device, and
   the game processor places a block in the game world in accordance with an input from the portable display device.

7. The non-transitory computer-readable storage medium according to claim 1, wherein the first game image and the second game image are identical game images the display of which are synchronized so that changing a viewpoint of one of the first and second images results in a change in viewpoint of the other of the first and second game images.

8. The non-transitory computer-readable storage medium according to claim 7, wherein display modes of at least one object in the game world are different in the first game image and the second game image.

9. The non-transitory computer-readable storage medium according to claim 8, wherein a display mode of the specific object in the first game image is a display mode that is more advantageous for a player than a display mode of the specific object in the second game image.

10. The non-transitory computer-readable storage medium according to claim 1, wherein the first game image and the second game image are game images wherein one of the first and second game images is slaved to the other of the first and second game images to both show an identical range of the identical game world.

11. The non-transitory computer-readable storage medium according to claim 1, wherein the first display controller outputs the first game image to the portable display device through wireless transmission.

12. The non-transitory computer-readable storage medium according to claim 1, wherein the first display controller compresses and outputs the first game image to the portable display device.

13. The non-transitory computer-readable storage medium according to claim 1, wherein
an input that is different from the touch panel is provided on the portable display device, and
in addition to an input from the touch panel, the first input receiver receives an input also from the different input.

14. The non-transitory computer-readable storage medium according to claim 1, wherein
the computer is further configured as a displacement amount determiner configured to determine an amount of image shift based on a change in at least one of position and orientation of the portable display device, and
the image generator changes, in accordance with the amount of shift determined by the displacement amount determiner, a relative position of the range of the game world displayed in the first game image with respect to a range of the game world displayed in the second game image.

15. The non-transitory computer-readable storage medium according to claim 14, wherein the displacement amount determiner detects a movement of the portable display device based on a signal from the portable display device, and determines the amount of shift in accordance with the movement of the portable display device.

16. A game apparatus communicable with (a) a portable display device including a touch panel and a display, and (b) at least one input device, the game apparatus comprising:
a first input circuit configured to obtain an input onto the touch panel from the portable display device,
a second input circuit configured to obtain from the at least one input device an input onto the input device;
a game processor configured to conduct a predetermined game process based on an input onto the touch panel obtained by the first input circuit and an input onto the at least one input device obtained by the second input circuit;
an image generator configured to generate a first game image and a second game image of an identical game world in accordance with a game process result obtained by the game processor, the first game image and the second game image are game images of the game world viewed from the same direction;
a first display controller configured to output, to the portable display device, the first game image generated by the image generator; and
a second display controller configured to output, to a display device that is different from the portable display device and the input device, the second game image generated by the image generator, wherein
the game processor generates a predetermined event at a position in the game world corresponding to a position on the first game image instructed through the touch panel;
wherein the game apparatus wirelessly receives input from each of the input device and the portable display device and wirelessly transmits, to the portable display device, data of the first game image generated in accordance with a game process based on the obtained input, and
the input device does not display an object operated using the input device, and the object operated using the input device is displayed on the display device that is different from the portable display device and the input device,
the game processor being further configured to cause a new geographical object to appear at the instructed position when nothing exists in the game world at the instructed position.

17. A game system comprising (a) a portable display device including a touch panel and a display, and (b) at least one input device, the game system comprising:
a first input receiver configured to receive an input from the touch panel,
a second input receiver configured to receive an input from the at least one input device;
a game processor configured to conduct a predetermined game process based on an input received by the first input receiver from the touch panel and an input received by the second input receiver from the at least one input device;
an image generator configured to generate a first game image and a second game image of an identical game world in accordance with a game process result obtained by the game processor, the first game image and the second game image are game images of the game world viewed from the same direction;
a first display controller configured to output, to the portable display device, the first game image generated by the image generator; and
a second display controller configured to output, to a display device that is different from the portable display device and the input device, the second game image generated by the image generator, wherein
the game processor generates a predetermined event at a position in the game world corresponding to a position on the first game image instructed through the touch panel;
wherein the game system wirelessly receives input from each of the input device and the portable display device and wirelessly transmits, to the portable display device, data of the first game image generated in accordance with a game process based on the received input, and
the input device does not display an object operated using the input device, and the object operated using the input device is displayed on the display device that is different from the portable display device and the input device,
the game processor being further configured to cause a new geographical object to appear at the instructed position when nothing exists in the game world at the instructed position.

18. A game processing method for conducting a game process in accordance with an input from (a) a portable display device including a touch panel and a display, and (b) an input from at least one input device, the method comprising:
receiving an input from the touch panel;
receiving an input from the at least one input device;
conducting a predetermined game process based on the input received from the touch panel and the input received from the at least one input device;
generating a first game image and a second game image of an identical game world in accordance with a game process result, the first game image and the second game image are game images of the game world viewed from the same direction;
outputting, to the portable display device, the generated first game image; and
outputting, to a display device that is different from the portable display device and the at least one input device, the generated second game image, wherein in the game process, a predetermined event is generated at a position in the game world corresponding to a position on the first game image instructed through the touch panel;
the game processing method is executed by a computer;
at least one of receiving, conducting, generating and outputting is executed by using a computer processor;
the input receiving wirelessly receives input from each of the input device and the portable display device and the outputting wirelessly transmits, to the portable display device, data of the first game image generated in accordance with a game process based on the received input; and
the input device does not display an object operated using the input device, and the object operated using the input device is displayed on the display device that is different from the portable display device and the input device,
the game processor being further configured to cause a new geographical object to appear at the instructed position when nothing exists in the game world at the instructed position.

19. A non-transitory computer-readable storage medium having stored thereon a game program executed by a computer of a game apparatus for conducting a game process in accordance with (a) an input from a portable display device including a touch panel and display, and (b) an input from at least one input device, the computer being caused to function as:
a first input receiver configured to wirelessly receive an input from the portable display device touch panel,
a second input receiver configured to wirelessly receive an input from the at least one input device;
a game processor configured to conduct a predetermined game process based on an input received by the first input receiver from the touch panel and an input received by the second input receiver from the at least one input device;
an image generator configured to generate a first game image and a second game image of an identical game world in accordance with a game process result obtained by the game processor;
a first display controller configured to wirelessly output, to the portable display device, data representing the first game image generated by the image generator; and
a second display controller configured to output, to a display device that is different from the portable display device and the input device, data representing the second game image generated by the image generator, wherein
the game processor generates a predetermined event at a position in the game world corresponding to a position on the first game image instructed through the touch panel,
the first game image and the second game image are game images of the game world viewed from the same direction,
wherein display of the first and second game images are linked so that a change in viewpoint of one of the first and second game images causes a change in viewpoint of the other of the first and second game images, and
the input device does not display an object operated using the input device, and the object operated using the input device is displayed on the display device that is different from the portable display device and the input device,
the game processor being further configured to cause a new geographical object to appear at the instructed position when nothing exists in the game world at the instructed position.

20. A game apparatus communicable with (a) a portable display device including a touch panel, and (b) at least one input device, the game apparatus comprising:
a first input circuit configured to wirelessly obtain an input onto the touch panel from the portable display device,
a second input circuit configured to wirelessly obtain an input from the at least one input device an input onto the input device;
a game processor configured to conduct a predetermined game process based on an input onto the touch panel obtained by the first input circuit and an input onto the at least one input device obtained by the second input circuit;
an image generator configured to generate a first game image and a second game image of an identical game world in accordance with a game process result obtained by the game processor, the first game image and the second game image are game images of the game world viewed from the same direction;
a first display controller configured to wirelessly output, to the portable display device, data representing the first game image generated by the image generator; and
a second display controller configured to output, to a display device that is different from the portable display device and the input device, data representing the second game image generated by the image generator, wherein
the game processor generates a predetermined event at a position in the game world corresponding to a position on the first game image instructed through the touch panel;
wherein the image generator generates the second game image so that a viewpoint change of one of the first and second game images results in a change in viewpoint of the other of the first and second game images; and
the input device does not display an object operated using the input device, and the object operated using the input device is displayed on the display device that is different from the portable display device and the input device,
the game processor being further configured to cause a new geographical object to appear at the instructed position when nothing exists in the game world at the instructed position.

21. A game system comprising (a) a portable display device including a touch panel and (b) at least one input device, the game system comprising:
a first input receiver configured to wirelessly receive an input from the portable display device touch panel,
a second input wireless receiver configured to wirelessly receive an input from the at least one input device;
a game processor configured to conduct a predetermined game process based on an input received by the first input receiver from the touch panel and an input received by the second input receiver from the at least one input device;
an image generator configured to generate a first game image and a second game image of an identical game world in accordance with a game process result obtained by the game processor, the first game image and the second game image are game images of the game world viewed from the same direction;

a first display controller configured to wirelessly output, to the portable display device, the first game image generated by the image generator; and a second display controller configured to output, to a display device that is different from the portable display device and the input device, the second game image generated by the image generator, wherein the game processor generates a predetermined event at a position in the game world corresponding to a position on the first game image instructed through the touch panel;

wherein the image generator generates the second game image so that a viewpoint change of one of the first and second game images results in a change in viewpoint of the other of the first and second game images, and the input device does not display an object operated using the input device, and the object operated using the input device is displayed on the display device that is different from the portable display device and the input device, the game processor being further configured to cause a new geographical object to appear at the instructed position when nothing exists in the game world at the instructed position.

* * * * *